United States Patent
Dong et al.

(10) Patent No.: US 12,028,191 B2
(45) Date of Patent: Jul. 2, 2024

(54) MULTI PULSE AMPLITUDE MODULATION SIGNALING DECISION FEEDBACK EQUALIZER HAVING POWER DIFFERENTIATING MODES AND TAP-WEIGHT RE-CONFIGURATION

(71) Applicant: Intel Corporation, Santa Clara, CA (US)

(72) Inventors: Yikui Dong, Cupertino, CA (US); Shenggao Li, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 17/951,562

(22) Filed: Sep. 23, 2022

(65) Prior Publication Data

US 2023/0019127 A1    Jan. 19, 2023

Related U.S. Application Data

(63) Continuation of application No. 17/119,684, filed on Dec. 11, 2020, now Pat. No. 11,483,184.

(51) Int. Cl.
*H04L 25/03*    (2006.01)

(52) U.S. Cl.
CPC .. *H04L 25/03057* (2013.01); *H04L 25/03019* (2013.01)

(58) Field of Classification Search
CPC ........... H04L 25/0264; H04L 25/03006; H04L 25/03019; H04L 25/03057; H04L 25/03267; H04L 25/03878; H04L 25/03885; H04L 2025/03433; H04L 2025/03554; H04L 2025/0356

USPC ........ 375/232, 233, 346, 348, 350; 708/322, 708/323

See application file for complete search history.

(56) References Cited

U.S. PATENT DOCUMENTS

| | | | |
|---|---|---|---|
| 9,374,250 B1 | 6/2016 | Musah et al. | |
| 9,699,009 B1 | 7/2017 | Ainspan et al. | |
| 10,038,575 B1 | 7/2018 | Steffan et al. | |
| 10,103,743 B1* | 10/2018 | Wang | H03M 1/007 |
| 2004/0203559 A1* | 10/2004 | Stojanovic | H04L 25/03057 455/403 |
| 2006/0188043 A1 | 8/2006 | Zerbe et al. | |
| 2013/0101000 A1 | 4/2013 | Warke et al. | |
| 2015/0002326 A1* | 1/2015 | Farley | H03M 1/002 327/91 |

(Continued)

OTHER PUBLICATIONS

"U.S. Appl. No. 17/119,684, Advisory Action dated Apr. 6, 2022", 3 pgs.

(Continued)

*Primary Examiner* — Young T. Tse
(74) *Attorney, Agent, or Firm* — Schwegman Lundberg & Woessner

(57) ABSTRACT

Some embodiments include apparatus having multiple samplers in a decision feedback equalizer (DFE). The multiple samplers include at least two samplers and are configured to be activated in a first mode of the DFE to receive first input information from a summing circuit. At least one of the samplers is configured to be deactivated in a second mode of the DFE. At least one of the samplers is configured to be activated in the second mode of the DFE to receive second input information from the summing circuit.

20 Claims, 13 Drawing Sheets

(56) References Cited

U.S. PATENT DOCUMENTS

| | | |
|---|---|---|
| 2015/0358005 A1 | 12/2015 | Chen et al. |
| 2018/0097665 A1* | 4/2018 | Li .................. H04L 69/28 |
| 2018/0248577 A1 | 8/2018 | Hossain et al. |
| 2020/0007363 A1 | 1/2020 | Hossain et al. |
| 2020/0084069 A1* | 3/2020 | Rane ................. H04L 25/03057 |
| 2022/0191069 A1 | 6/2022 | Dong et al. |

OTHER PUBLICATIONS

"U.S. Appl. No. 17/119,684, Advisory Action dated May 18, 2022", 3 pgs.

"U.S. Appl. No. 17/119,684, Advisory Action dated Jun. 7, 2022", 3 pgs.

"U.S. Appl. No. 17/119,684, Examiner Interview Summary dated May 2, 2022", 2 pgs.

"U.S. Appl. No. 17/119,684, Examiner Interview Summary dated Jun. 10, 2022", 3 pgs.

"U.S. Appl. No. 17/119,684, Final Office Action dated Jan. 6, 2022", 9 pgs.

"U.S. Appl. No. 17/119,684, Non Final Office Action dated Apr. 15, 2021", 8 pgs.

"U.S. Appl. No. 17/119,684, Notice of Allowance dated Jun. 15, 2022", 9 pgs.

"U.S. Appl. No. 17/119,684, Notice of Non-Compliant Amendment dated Aug. 16, 2021", 3 pgs.

"U.S. Appl. No. 17/119,684, Response filed Mar. 31, 2022 to Final Office Action dated Jan. 6, 2022", 10 pgs.

"U.S. Appl. No. 17/119,684, Response filed May 6, 2022 to Advisory Action dated Apr. 6, 2022", 11 pgs.

"U.S. Appl. No. 17/119,684, Response filed May 25, 2022 to Advisory Action dated May 18, 2022", 8 pgs.

"U.S. Appl. No. 17/119,684, Response filed Jun. 6, 2022 to Advisory Action dated May 18, 2022", 7 pgs.

"U.S. Appl. No. 17/119,684, Response filed Jul. 15, 2021 to Non Final Office Action dated Apr. 15, 2021", 11 pgs.

"U.S. Appl. No. 17/119,684, Response filed Oct. 15, 2021 to Notice of Non-Compliant Amendment dated Aug. 16, 2021", 8 pgs.

* cited by examiner

| LEVEL | TAP_HI | TAP_MID | TAP_LOW | TAP_MSB | TAP_LSB |
|---|---|---|---|---|---|
| L4 | 1 | 1 | 1 | 1 | 1 |
| L3 | 0 | 1 | 1 | 1 | 0 |
| L2 | 0 | 0 | 1 | 0 | 1 |
| L1 | 0 | 0 | 0 | 0 | 0 |

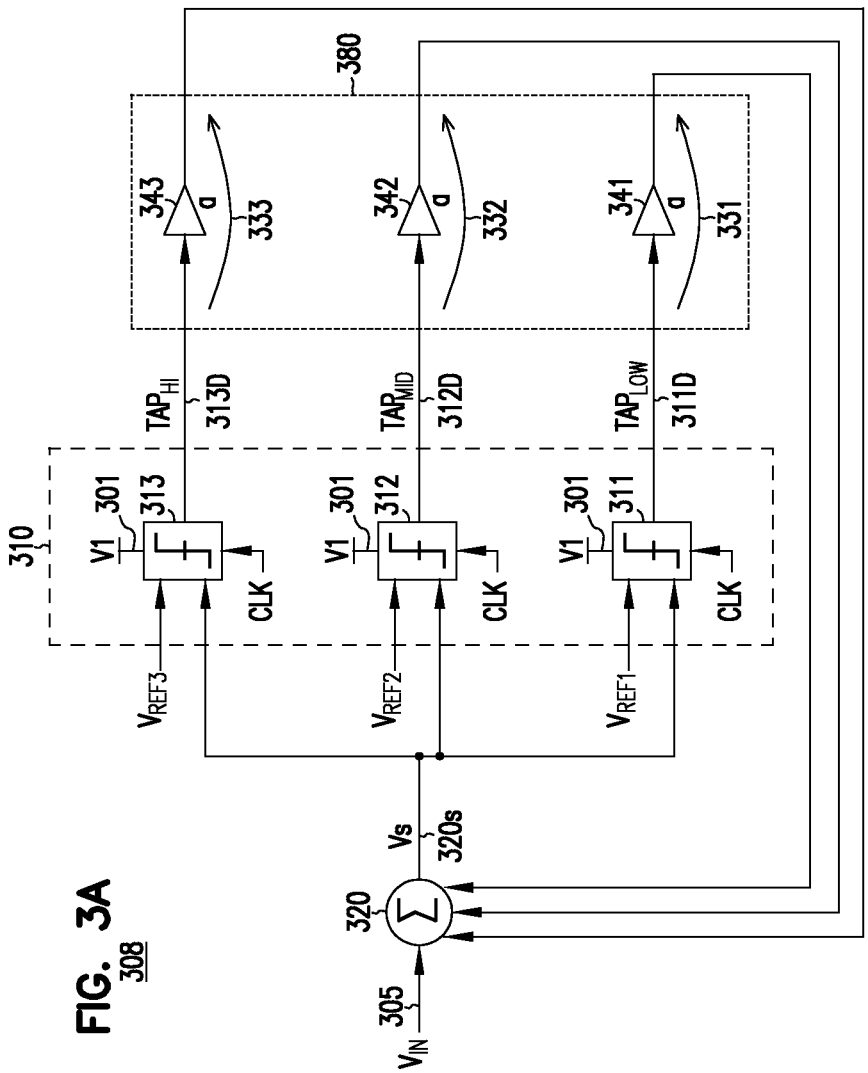

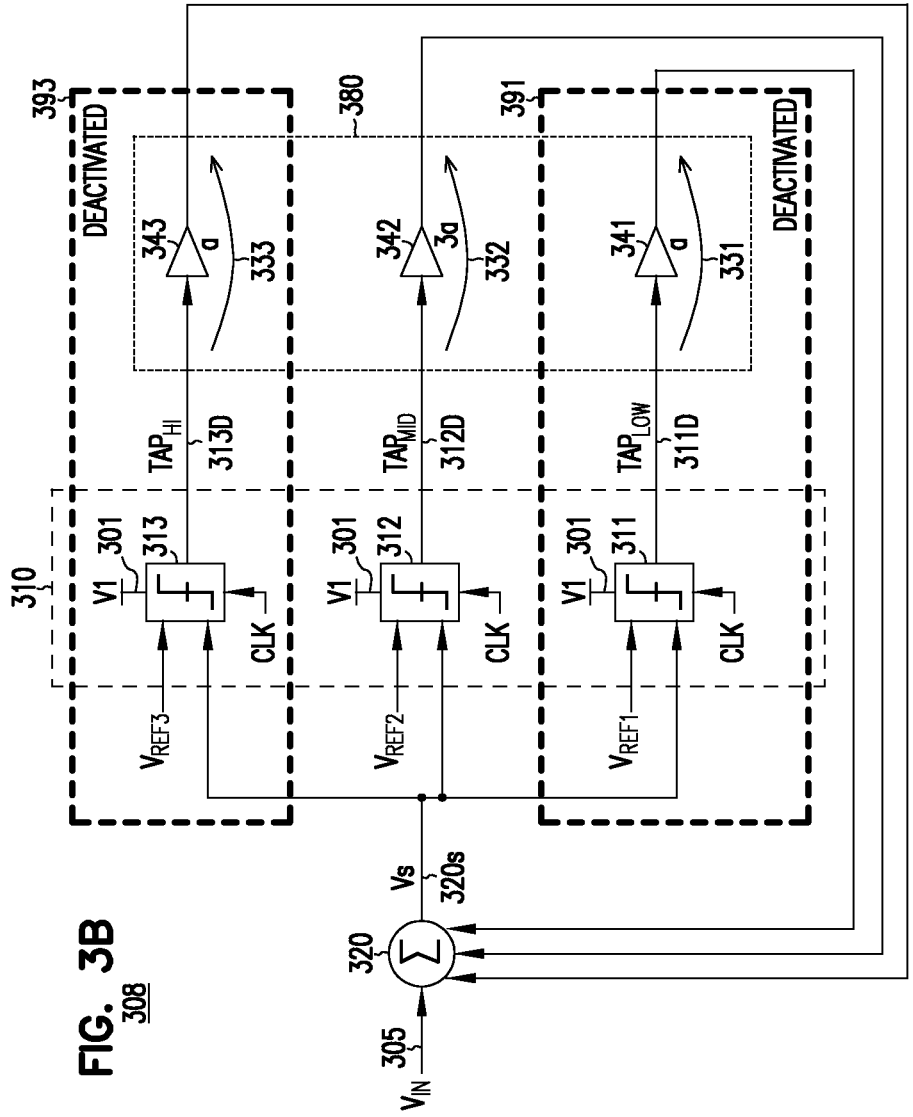

508

508

708

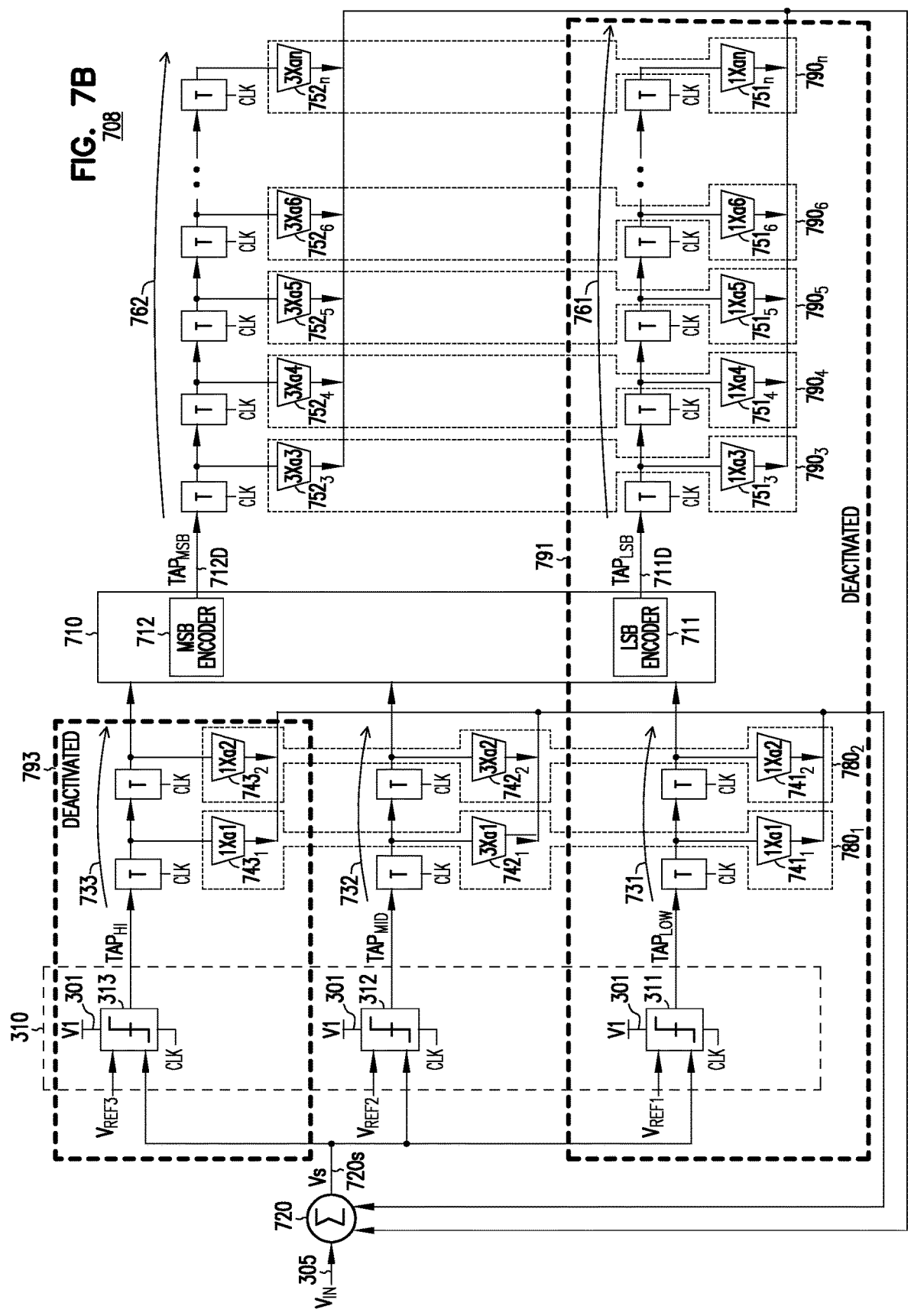

MULTI PULSE AMPLITUDE MODULATION SIGNALING DECISION FEEDBACK EQUALIZER HAVING POWER DIFFERENTIATING MODES AND TAP-WEIGHT RE-CONFIGURATION

This application is a continuation of U.S. patent application Ser. No. 17/119,684, filed Dec. 11, 2020, which is incorporated herein by reference in its entirety.

TECHNICAL FIELD

Embodiments described herein pertain to decision feedback equalizers (DFEs). Some embodiments relate to DFEs capable of operating pulse-amplitude modulation (PAM) and non-return-to-zero (NRZ) signaling protocols.

BACKGROUND

Many electrical devices communicate with each other in the form of electrical signals. Pulse amplitude modulation (PAM) signaling (e.g., 4-level PAM or PAM4) and NRZ signaling are different types of signals that are widely used in high-speed (e.g., gigabit per second (Gbps) range) in wireline communication protocols. A DFE is often use in a device to improve the quality of the signals after the signals are received at the device. Some conventional techniques try to use the same DFE architecture for PAM4 DFE function and NRZ DFE function. A major drawback of such conventional techniques is that power consumption in NRZ DFE function is the same as that of PAM4 DFE function. This can create a significant disadvantage for some applications. For example, different generations of Peripheral Component Interconnect Express (PCIe) applications use PAM4 signaling and NRZ signaling. Using a conventional PAM4 DFE architecture for NRZ signaling in some PCIe applications may pay a heavy penalty in power consumption in comparison with a stand-alone NRZ DFE architecture.

BRIEF DESCRIPTION OF THE DRAWINGS

FIG. 3A shows a block diagram of a DFE having a uniform tap weight (uniform tap coefficient) configured to operate in PAM4 mode, according to some embodiments described herein.

FIG. 3B shows the DFE of FIG. 3A configured to operate in NRZ mode, according to some embodiments described herein.

FIG. 7B shows the block diagram of the DFE of FIG. 7A configured to operate in NRZ mode, according to some embodiments described herein.

DETAILED DESCRIPTION

The techniques described herein relate to a DFE that can be configured to operate in multiple pulse amplitude modulation (PAM) mode circuits, for example, in both PAM4 mode to process PAM4 signaling or PAM2 (i.e., NRZ) mode to process NRZ signaling. In NRZ mode, some portions of the DFE can be deactivated to save power. The tap weight applied to DFE summer circuit of the DFE can be reconfigured in NRZ mode to maintain proper operation of the DFE. Power consumption in NRZ mode of the DFE described herein can be lower than that of PAM4 mode. Further, power consumption in NRZ mode of the described DFE can be lower than that of a conventional PAM4 DFE architecture used for NRZ DFE function. Other improvements and benefits of the described techniques are discussed below. The techniques described herein use PAM4 and NRZ signals as an example. However, one skilled in the art will readily recognize that the techniques described herein are applicable to 8-level PAM (PAM8), 16-level PAM (PAM16), or other multiple levels PAM signaling.

Figure 1:
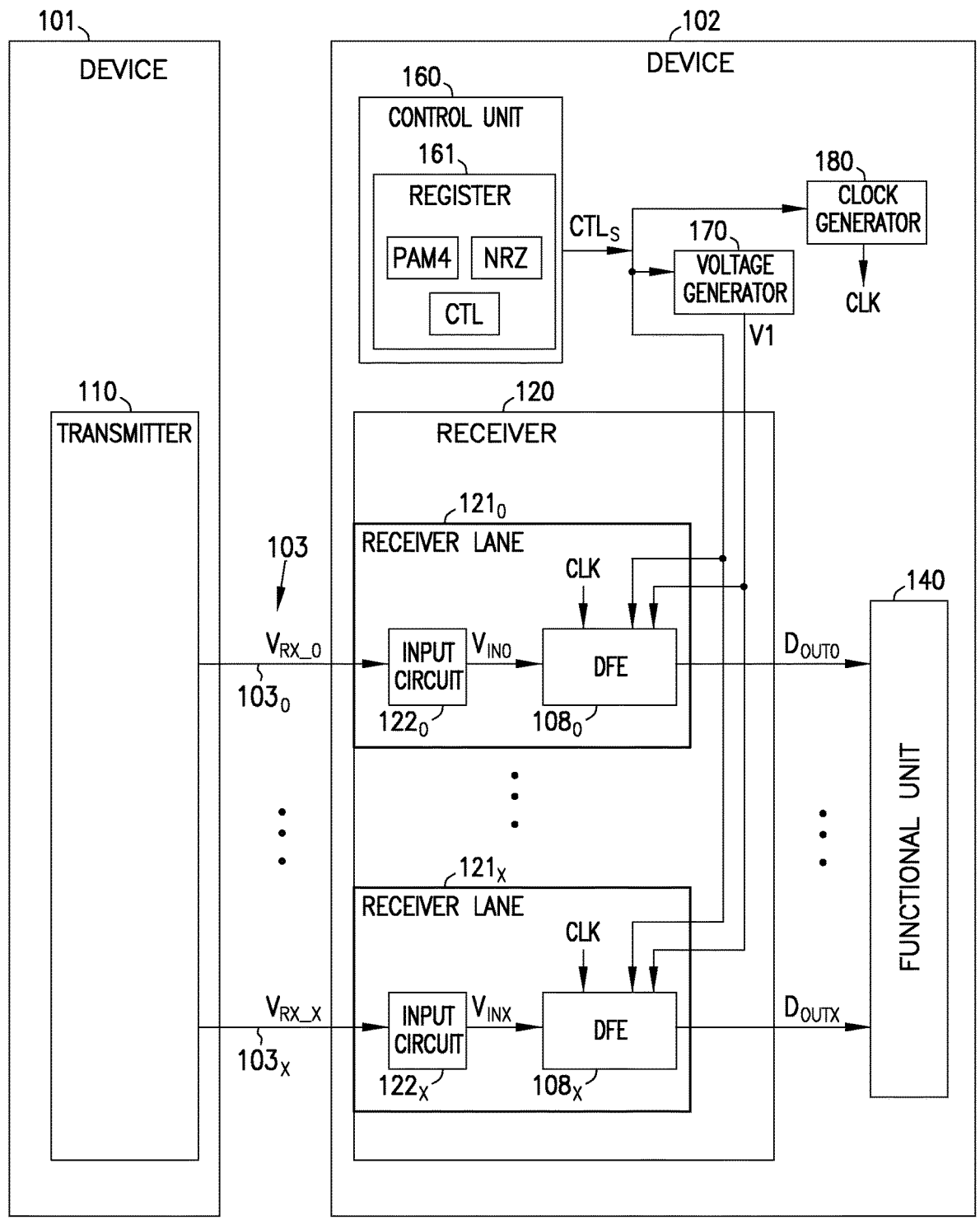
FIG. 1 shows an apparatus including devices and a channel between the devices, according to some embodiments described herein.

FIG. 1 shows apparatus 100 including devices 101 and 102, and channel 103 between devices 101 and 102, according to some embodiments described herein. Apparatus 100 can include or be included in an electronic device or system, such as a computer (e.g., server, desktop, laptop, or notebook), a tablet, a cellular phone, or other electronic devices or systems. Device 101 can include or be included in (e.g., formed in or formed on) an integrated circuit (IC) die (e.g., a semiconductor die or an IC chip). Device 102 can include or be included in (e.g., formed in or formed on) an IC die that can be different from or the same as the IC of device 101.

Apparatus 100 can include or be included in a system-on-chip (SoC), such that device 101, 102, or both can be included (e.g., integrated) in the SoC. Devices 101 and 102 can include a combination of a controller (e.g., processors (e.g., central processing unit (CPU)), input/output controllers, or memory controllers), a memory device, or other electronic devices.

As shown in FIG. 1, devices 101 and 102 can include transmitter 110 and receiver 120, respectively. Channel 103 can provide communication (e.g., in the form of signal transmission) between devices 101 and 102. Channel 103 can include lanes (e.g., links) $103_0$ through $103_X$ to conduct signals between devices 101 and 102. Each of lanes $103_0$ through $103_X$ can be used to carry a single-ended signal or alternatively differential signals. Each of lanes $103_0$ through $103_X$ can include a single conductive line (e.g., for transmission of single-end signals) or alternatively multiple conductive lines (e.g., for transmission of differential signals). The conductive lines of lanes $103_0$ through $103_X$ can include metal-based (e.g., copper) traces of a bus on a circuit board (e.g., printed circuit board of an electronic system) where devices 101 and 102 are located. Devices 101 and 102 may communicate with each other using signals at a relatively high frequency (e.g., in the gigahertz range). For example, device 101 may transmit data to device 102 at a transfer rate of gigabits per second (Gbs) per lane.

Channel 103 can be configured to conform with one of Universal Serial Bus (USB), High-Definition Multimedia Interface (HDMI), Thunderbolt, Peripheral Component Interconnect Express (PCIe), and Ethernet specifications. In an alternative arrangement, channel 103 does not have to include conductive lines on a circuit board. For example, channel 103 can include a medium (e.g., air) for wireless communication between devices 101 and 102.

As shown in FIG. 1, transmitter 110 may transmit signals $V_{RX\_0}$ through $V_{RX\_X}$ to receiver 120 on lanes $103_0$ through $103_X$, respectively. Each of signals Bgs $V_{RX\_0}$ through $V_{RX\_X}$ can include a single-ended signal or differential signals. Receiver 120 can generate signals $D_{OUT0}$ through $D_{OUTX}$. A functional unit 140 of device 102 may receive signals $D_{OUT0}$ through $D_{OUTX}$ for further processing. Examples of functional unit 140 include part of a processing core (e.g., CPU), part of a memory unit, or other types of functional units.

Each of receiver lanes $121_0$ through $121_X$ can perform an equalization operation on a respective analog input signal to generate a respective digital output signal (e.g., bits of information). For example, receiver lane $121_0$ can generate signal (e.g., output signal) $D_{OUT0}$ based on signal (e.g., input signal) $V_{RX\_0}$. Receiver lane $121_X$ can generate signal (e.g., output signal) $D_{OUTX}$ based on signal (e.g., input signal) $V_{RX\_X}$. Each of signals $D_{OUT0}$ and $D_{OUTX}$ can be a digital signal that carries bits (e.g., data bits). FIG. 1 shows an example where receiver 120 includes two receiver lanes. The number of receiver lanes in receiver 120 may vary.

As shown in FIG. 1, receiver lane $121_0$ can include input circuit $122_0$ (which can include a continuous time linear equalizer (CTLE)), and DFE $108_0$. Input circuit $122_0$ can perform an equalization operation (e.g., a CTLE operation) to equalize (e.g., reduce noise in) signal $V_{RX\_0}$ and generate signal (e.g., input signal) $V_{IN0}$. Signal $V_{IN0}$ can be called input information received by DFE $108_0$. DFE $108_0$ can perform an equalization operation (e.g., DFE operation) on signal $V_{IN0}$ and generate signal $D_{OUT0}$. Signals $V_{IN0}$ and $D_{OUT0}$ can be called input information (received by DFE $108_0$) and output information (provided by DFE $108_0$), respectively.

In a similar arrangement as receiver lane $121_0$, receiver lane $121_X$ can include input circuit $122_X$ and DFE $108_X$. Receiver lane $121_X$ can operate to receive signal $V_{RX\_X}$ and generate signal (e.g., input signal) $V_{INX}$ and signal (e.g., output information) $D_{OUTX}$. Signals $V_{INX}$ and $D_{OUTX}$ can be called input information (received by DFE $108_X$) and output information (provided by DFE $108_X$), respectively.

As shown in FIG. 1, receiver 120 can include control unit 160 including register circuit 161, a voltage generator 170, and a clock generator 180.

Voltage generator 170 can generate a voltage V1. Receiver 120 may use voltage V1 as its supply voltage. For example, each of DFE $108_0$ and DFE $108_X$ can include supply node (not labeled) to receive voltage V1. Each of DFE $108_0$ and DFE $108_X$ can use voltage V1 as a supply voltage for its components (e.g., summering circuits, samplers, delay circuits, and other circuits in the DFE, not shown in FIG. 1).

Receiver 120 may use clock signal CLK as timing information for its operations. For example, each of DFE $108_0$ and DFE $108_X$ can include a clock node (not labeled) to receive respective clock signal CLK. Each of DFE $108_0$ and DFE $108_X$ can use clock signal CLK as timing information during operations of components (e.g., summing circuits, samplers, delay circuits, and other circuits in the DFE, not shown in FIG. 1).

In FIG. 1, signals $V_{RX\_0}$ through $V_{RX\_X}$ can be PAM4 signals transmitted on channel 103 based on PAM4 signaling protocol. Alternatively, signals $V_{RX\_0}$ through $V_{RX\_X}$ can be NRZ signals transmitted on channel 103 based on NRZ signaling protocol. Receiver 120 can be configured to operate in either PAM4 mode process PAM4 signals or NRZ mode to process NRZ signals.

Control unit 160 can be configured to provide appropriate control information to receiver 120 depending on which mode (e.g., PAM4 or NRZ) receiver 120 is configured to operate. Configuring control unit 160 can include providing specific components to control unit 160 to enable it to perform (e.g., control) operations of receiver 120 including operations of DFE $108_0$ and DFE $108_X$. Such specific components can include firmware, hardware circuitry, or software or any combination of firmware, hardware circuitry, and software. Although not shown in FIG. 1, control unit 160 can include additional components such as a state machine (e.g., finite state machine), read-only-memory (ROM), and other components that can be configured to cause receiver 120 including DFE $108_0$ and DFE $108_X$ to perform the operations (e.g., process PAM4 and NRZ signals) described herein.

As shown in FIG. 1, control unit 160 can include a register circuit 161 that can be configured (e.g., programmable) to store information (e.g., parameter settings) associated with operations of receiver 120. For example, register circuit 161 can be configured to store information that identifies which mode (PAM4 mode or NRZ mode) receiver 120 (including DFE $108_0$ and DFE $108_X$) operates. In another example, register circuit 161 can also be configured to store (e.g., set) different values of control information CTL depending on which mode (PAM4 mode or NRZ mode) receiver 120 (including DFE $108_0$ and DFE $108_X$) operate.

Control information CTL can include information (e.g., control signals (e.g., control bits)) $CTL_S$ that can be used to control some circuit elements (e.g., switches) of the DFEs described below (e.g., DFE 308, DFE 508, DFE 708, and DFE 808). For example, control unit 160 can use information $CTL_S$ to selectively disconnect power (e.g., voltage V1), selectively disconnect a clock signal (e.g., clock signal CLK), or both power and clock signal provided to some other circuit elements (e.g., samplers) of DFE $108_0$ and DFE $108_X$ during a particular mode (e.g., NRZ mode) of DFE $108_0$ and DFE $108_X$. Operations of DFE $108_0$ and DFE $108_X$ are not described in detail. However, such operations of DFE $108_0$ and DFE $108_X$ can be similar to or the same as operations of the DFEs (e.g., DFEs 208, 308, 508, 708, and 808) described below with reference to FIG. 2A through FIG. 8.

In FIG. 1, receiver 120 can be configured (e.g., dynamically set), such that the mode (PAM4 mode or NRZ mode) may be unchangeable after it is set. For example, after receiver 120 is set to operate in PAM4, receiver 120 may not be set (e.g., reset) to NRZ mode, or vice versa. Setting PAM4 mode or NRZ mode in receiver 120 can include changing setting values (which indicates either PAM4 mode or NRZ mode) in control unit 160.

In an alternative configuration, receiver 120 can be configured (e.g., dynamically set), such that a particular mode (e.g., PAM4 mode) can be changed to another mode (e.g., NRZ mode) after that particular mode is set. Thus, in the alternative configuration (e.g., dynamic configuration), PAM4 mode and NRZ mode can be changed back and forth (e.g., dynamically), depending on which mode (PAM4 mode or NRZ mode) receiver 120 is set to operate at a particular time. As an example of a dynamic configuration, settings in register circuit 161 can be set during an initialization stage (e.g., handshake stage) during a transmission of data from transmitter 110 to receiver 120. In this example, transmitter 110 and receiver 120 can communicate with each other during such an initialization stage to set appropriate mode (PAM4 mode or NRZ mode) for transmission of information (e.g., data) from transmitter 110 and receiver 120.

The ability of operating in either PAM4 mode or NRZ mode (either by static configuration or by dynamic configuration, as described above) can allow receiver 120 (including DFE $108_0$ and DFE $108_X$) to have improvements and benefits over some conventional receivers that can operate in only one mode (e.g., either PAM4 mode or NRZ mode).

DFE $108_0$ and DFE $108_X$ can include structures (e.g., circuit elements) and operations similar to or the same as any of the DFEs described below with reference to FIG. 2A through FIG. 8.

Figure 2A:
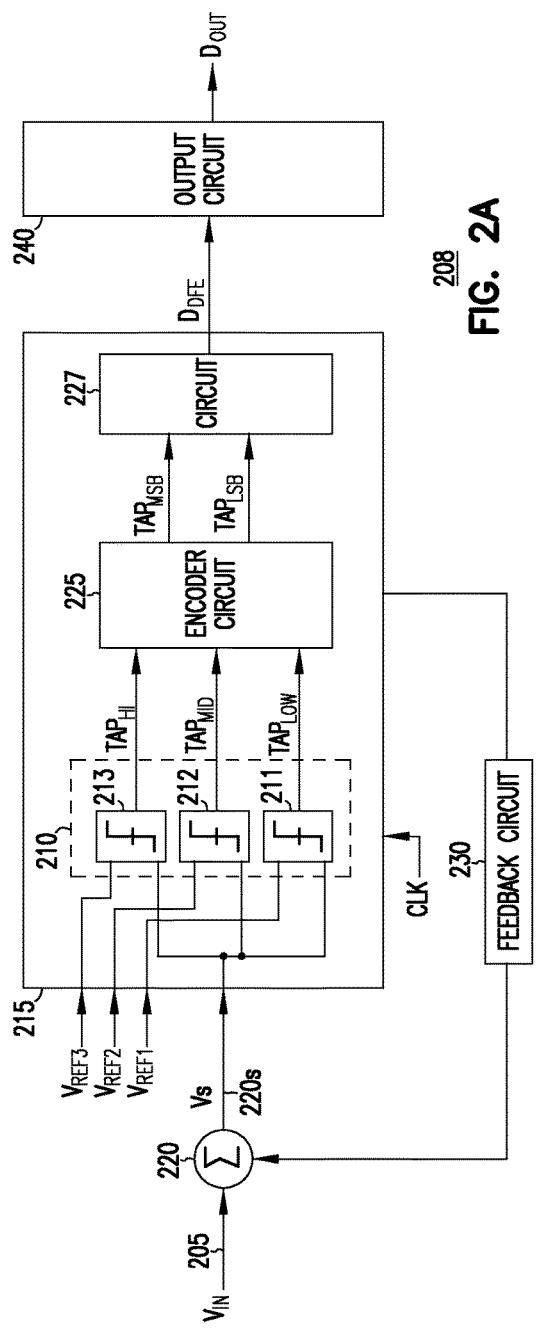
FIG. 2A shows a block diagram of a DFE including decision circuitry and feedback circuits, according to some embodiments described herein.

FIG. 2A shows a block diagram of a DFE 208 including decision circuitry 215 and a feedback circuit 230, according to some embodiments described herein. DFE 208 can receive a signal (e.g., input signal) $V_{IN}$ at a node 205 and perform an equalization operation (e.g., DFE operation) on signal $V_{IN}$ and generate signal (output information) $D_{OUT}$. Signal $V_{IN}$ can be provided to DFE 208 from an input circuit (e.g., a CTLE) like one of input circuits $122_0$ and $122_X$ of FIG. 1. Signal $D_{OUT}$ can correspond to one of signals $D_{OUT0}$ and $D_{OUTX}$ of FIG. 1. Thus, signal $D_{OUT}$ can be a digital signal that carries bits (e.g., data bits).

Signal $V_{IN}$ can include PAM4 signals or NRZ signals. DFE 208 can be configured to operate in one mode (e.g., PAM4 mode) to process PAM4 signals and in another mode (e.g., NRZ mode) to process NRZ signals. Thus, signal $V_{IN}$ can include PAM4 signals in PAM4 mode or NRZ signals in NRZ mode. DFE 208 can be included in device 102 (FIG. 1) as the DFEs (e.g., DFE $108_0$ and DFE $108_X$) of receiver 120 of device 102. Thus, control unit 160 of device 102 can control (e.g., can cause) DFE 208 to operate like DFE $108_0$ and DFE $108_X$ (FIG. 1). For example, control unit 160 can cause DFE 208 to operate in either PAM4 mode or NRZ mode.

Decision circuitry 215 can generate signal (DFE output information) $D_{DFE}$ based on signal $V_{IN}$. Signal $D_{DFE}$ can be a digital signal that carries bits (e.g., data bits). DFE 208 can include an output circuit 240 to receive $D_{DFE}$ and generate signal $D_{OUT}$ based on signal $D_{DF}$. Output circuit 240 can include a deserializer, which receives bits of information included in signal $D_{DEF}$ in a serial fashion and provide the bits in a parallel fashion to signal $D_{OUT}$. For simplicity, FIG. 2A shows signal $D_{OUT}$ being provided on a signal conductive line. However, signal $D_{OUT}$ can be provided on multiple conductive lines.

Figure 2C:
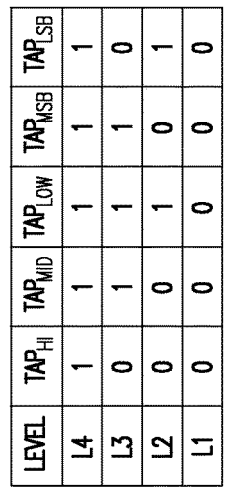
FIG. 2C is a table showing relationships of values among the levels of the input signal of FIG. 2B, values of information at respective outputs of samplers of the decision circuitry of FIG. 2A, and values of information at respective outputs of an encoder circuit of FIG. 2A, according to some embodiments described herein.
Figure 2B:
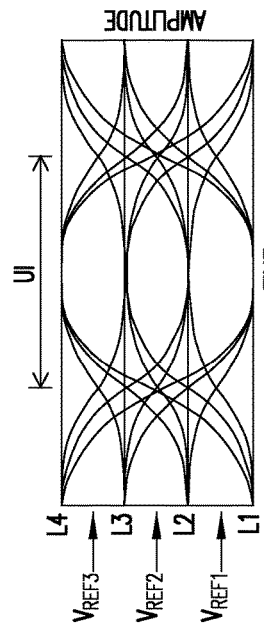
FIG. 2B shows an eye diagram of an input signal of FIG. 2A and the relationships among the levels of the input signal and reference thresholds in PAM4 mode of the DEF of FIG. 2A, according to some embodiments described herein.
Figure 2D:
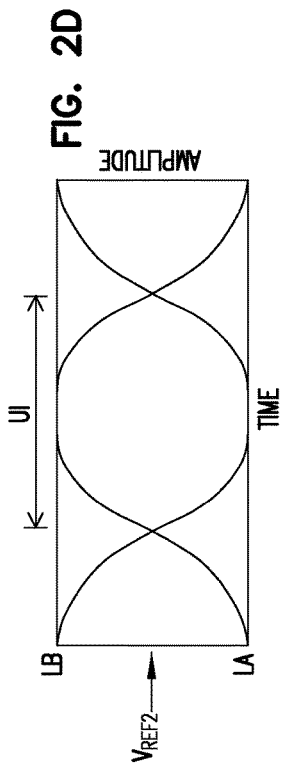
FIG. 2D shows an eye diagram of an input signal of FIG. 2A and the relationships among the levels of the input signal and a reference threshold in NRZ mode of DEF of FIG. 2A, according to some embodiments described herein.

As shown in FIG. 2A, DFE 208 can operate using timing information of clock signal CLK. For example, DFE 208 can sample information (e.g., symbols) included in signal $V_{IN}$ during each time interval (e.g., unit interval (UI)) associated with signal $V_{IN}$ at node 205. A UI can be equal to a period of clock signal CLK. A UI of PAM4 signal and a UI of NRZ signal are shown in FIG. 2B and FIG. 2D, respectively, (described below).

As shown in FIG. 2A, DFE 208 can include a summing circuit 220 to receive signal $V_{IN}$ at node 205, which can be an input (e.g., input node or input nodes) of summing circuit 220. Summing circuit 220 can include an output (e.g., output node or output nodes) 220s to provide a signal Vs. Output 220s can include summing nodes of summing circuit 220. The signal level of signal Vs can be based on signal $V_{IN}$ and feedback information provided by feedback circuit 230. Feedback circuit 230 can apply a tap weight (DFE tap coefficient) to signal $D_{DFE}$ and provide feedback information to summing circuit 220.

As shown in FIG. 2A, decision circuitry 215 can include a sampling circuit 210, an encoder circuit 225, and a circuit (e.g., data holding circuit) 227. Sampling circuit 210 can include samplers (e.g., slicers or comparators) 211, 212, and 213. Sampling circuit 210 can receive signal (e.g., input information) Vs from summing circuit 220. Sampling circuit 210 can also receive reference thresholds (e.g., reference voltages) Vref1, Vref2, and Vref3, respectively. The values (e.g., voltage values) of reference thresholds Vref1, Vref2, and Vref3 can be expressed as Vref1<Vref2<Verf3. The relationships among the values of reference thresholds Vref1, Vref2, and Vref3 and the levels (e.g., voltage levels) of signal $V_{IN}$ are shown in FIG. 2B (described below).

In FIG. 2A, samplers 211, 212, and 213 can operate to sample the same signal (e.g., signal Vs) based on timing information of clock signal CLK and reference thresholds Vref1, Vref2, and Vref3, respectively. For example, samplers 211, 212, and 213 can operate to compare signal Vs (e.g., a PAM4 signal) with reference thresholds Vref1, Vref2, and Vref3, respectively, and provide information $TAP_{LOW}$, $TAP_{MID}$, and $TAP_{HI}$, respectively, at respective outputs (not labeled) of samplers 211, 212, and 213 based on the comparisons. Information $TAP_{LOW}$, $TAP_{MID}$, and $TAP_{HI}$ are output information (e.g., digital output information) from sampling circuit 210 that can be represented by signals on the outputs (not labeled) of samplers 211, 212, and 213, respectively. Information $TAP_{LOW}$, $TAP_{MID}$, and $TAP_{HI}$ can include three bits at respective outputs of samplers 211, 212, and 213 during a UI of signal Vs (that corresponds to a UI of signal $V_{IN}$). The three bits can form a thermometer code that can be used by encoder circuit 225 (or by another circuit in decision circuitry 215) to determine the value (a binary value of two bits) of information represented by signal Vs in a UI (e.g., represented by one symbol of signal Vs).

Encoder circuit 225 can include a thermometer-to-binary encoder. For example, encoder circuit 225 can generate information $TAP_{LSB}$ and $TAP_{MSB}$ (e.g., 2-bit binary value)

based on information $TAP_{LOW}$, $TAP_{MID}$, and $TAP_{HI}$ (e.g., 3-bit thermal code) provided by samplers 211, 212, and 213. Information $TAP_{LSB}$ and $TAP_{MSB}$ are output information (e.g., digital output information) from encoder circuit 225 that can represent the least-significant-bit (MSB) and the most-significant-bit (MSB), respectively, of the combination of two bits. For example, the combination of information $TAP_{LSB}$ and $TAP_{MSB}$ can provide two bits (e.g., "00", "01" "10" or "11") included (e.g., encoded) in each symbol in signal Vs in a UI, where information $TAP_{LSB}$ and $TAP_{MSB}$ can be the least significant bit and the most significant bit, respectively, of the two bits. FIG. 2C (described below) shows the relationship between the values of the 3-bit thermometer code (included in information $TAP_{LOW}$, $TAP_{MID}$, and $TAP_{HI}$) and 2-bit binary value (included in information $TAP_{LSB}$ and $TAP_{MSB}$). Circuit 227 can receive information $TAP_{LSB}$ and $TAP_{MSB}$ and provide information $D_{DFE}$ to output circuit (e.g., deserializer) 240. In an alternative structure of DFE 208, circuit 227 can be omitted.

In DFE 208 of FIG. 2A, feedback circuit 230 can provide feedback information to summing circuit 220 in different ways. For example, feedback circuit 230 can provide feedback information to summing circuit 220 based on information $TAP_{LOW}$, $TAP_{MID}$, and $TAP_{HI}$ (e.g., based on only information $TAP_{LOW}$, $TAP_{MID}$, and $TAP_{HI}$ and without (not from) information $TAP_{LSB}$ and $TAP_{MSB}$). In another example, feedback circuit 230 can provide feedback information to summing circuit 220 based on information $TAP_{LSB}$ and $TAP_{MSB}$ (e.g., based on only information $TAP_{LSB}$ and $TAP_{MSB}$ and without (not from) information $TAP_{LOW}$, $TAP_{MID}$, and $TAP_{HI}$). In another example, feedback circuit 230 can provide feedback information to summing circuit 220 based on information $TAP_{LOW}$, $TAP_{MID}$, and $TAP_{HI}$ and information $TAP_{LSB}$ and $TAP_{MSB}$.

As mentioned above, DFE 208 can be configured to operate in PAM4 mode or NRZ mode. DFE 208 may be configured such that the amount of power consumed by DFE 208 in NRZ mode can be different from (e.g., less than) the amount of power consumed by DFE 208 in PAM4 mode. For example, to save power, part of DFE 208 (e.g., one or two of samplers 211, 212, and 213 and part of encoder circuit 225 and part of feedback circuit 230) can be deactivated (e.g., powered down (e.g., turned off)) when DFE 208 is configured to operate in NRZ mode.

FIG. 2B shows an eye diagram of signal $V_{IN}$ and the relationships among levels L1, L2, L3, and L4 of signal $V_{IN}$ and reference thresholds Vref1, Vref2, and Vref3 in PAM4 mode of DFE 208 of FIG. 2A, according to some embodiments described herein. As shown in FIG. 2B, signal $V_{IN}$ can include PAM4 signals where levels L1, L2, L3, and L4 can correspond to the different amplitudes (e.g., different voltage levels in volt unit) of signal $V_{IN}$. The value (e.g., voltage values) of each of reference thresholds Vref1, Vref2, and Vref3 can be between (e.g., at a midpoint of) respective two adjacent levels of signal $V_{IN}$. For example, as shown in FIG. 2B, reference threshold Vref1 can be between levels L1 and L2. Reference threshold Vref2 can be between levels L2 and L3. Reference threshold Vref3 can be between levels L3 and L4.

FIG. 2B also shows one UI of signal $V_{IN}$. The UI is measured in time unit (horizontal axis). For example, one UI of signal $V_{IN}$ can be equal to a period of a clock signal (e.g., signal CLK in FIG. 2A) used by sampling circuit 210 to sample signal $V_{IN}$. As shown in FIG. 2B, within one UI, signal $V_{IN}$ can have any of levels L1, L2, L3, and L4. Each of level L1, L2, L3, and L4 can be used to present a different value of a combination of two bits of information (e.g., "00, "01", "10", or "11") carried by signal $V_{IN}$ in one UI. Thus, within one UI, signal $V_{IN}$ can be used to carry two bits of information having one of four possible combinations of two bits (e.g., (e.g., "00, "01", "10", or "11").

FIG. 2C is a table showing relationships of values among levels L1, L2, L3, and L4 of signal $V_{IN}$ (FIG. 2B), values of information $TAP_{LOW}$, $TAP_{MID}$, and $TAP_{HI}$ at respective outputs of samplers 211, 212, and 213 (FIG. 2A), and values of information $TAP_{LSB}$ and $TAP_{MSB}$ at respective outputs of encoder circuit 225 (FIG. 2A), according to some embodiments described herein. As shown in FIG. 2C, each of levels L1, L2, L3, and L4 can be associated with respective 3-bit thermometer code (represented by information $TAP_{LOW}$, $TAP_{MID}$, and $TAP_{HI}$) and a respective 2-bit value (represented by information $TAP_{LSB}$ $TAP_{MSB}$) of one of four possible combinations of two bits of information carried in one UI of signal $V_{IN}$. For example, level L2 can be associated with 3-bit thermometer code "001" (represented by information $TAP_{LOW}$, $TAP_{MID}$, and $TAP_{HI}$) and a 2-bit value "01" (represented by information $TAP_{LSB}$ and $TAP_{MSB}$). In another example, level L3 can be associated with 3-bit thermometer code "011" (represented by information $TAP_{LOW}$, $TAP_{MID}$, and $TAP_{HI}$) and a 2-bit value "10" (represented by information $TAP_{LSB}$ and $TAP_{MSB}$).

FIG. 2D shows an eye diagram of signal $V_{IN}$ and the relationships among levels LA and LB of signal $V_{IN}$ and reference threshold Vref2 in NRZ mode of DFE 208 of FIG. 2A, according to some embodiments described herein. As shown in FIG. 2D, signal $V_{IN}$ can include NRZ signals (e.g., PAM2 signals) where levels LA and LB can correspond to the different amplitudes (e.g., different voltage levels in volt unit) of signal $V_{IN}$. Levels LA and LB can correspond to levels L1 and L4 of FIG. 2D. The value (e.g., voltage value) of reference threshold Vref2 can be between (e.g., at a midpoint of) levels LA and LB. FIG. 2D also shows one UI of signal $V_{IN}$. For example, one UI of signal $V_{IN}$ can be equal to a period of a clock signal (e.g., signal CLK in FIG. 2A) used by sampling circuit 210 to sample signal $V_{IN}$. As shown in FIG. 2D, within one UI, signal $V_{IN}$ can have one of levels LA and LB. Each of level LA and LB can be used to present a different value of a bit of information (e.g., "0" or "1") carried by signal $V_{IN}$ in one UI. Thus, within one UI, signal $V_{IN}$ can be used to carry one bit of information having one of two possible values of a bit (e.g., "0" or "1").

Some or all of the components of DFE 208 described above with reference to FIG. 2A through FIG. 2D can be similar to, or the same as, the components of the DFEs described below with reference to FIG. 3A through FIG. 8. Thus, detailed operations and power saving configurations of DFE 208 of FIG. 2A can be similar to, or the same as, operations and power saving configurations of the DFEs described below with reference to FIG. 3A through FIG. 8.

FIG. 3A shows a block diagram of a DFE 308 having a uniform tap weight (uniform tap coefficient) configured to operate in a PAM4 mode, according to some embodiments described herein. DFE 308 of FIG. 3 can be configured to operate in PAM4 mode to process PAM4 signals and in NRZ mode to process NRZ signals. DFE 308 can be included in receiver 120 of device 102 (FIG. 1) as the DFEs (e.g., DFE 108$_0$ and DFE 108$_X$) of receiver 120. Thus, control unit 160 of device 102 can control (e.g., can cause) DFE 308 to operate in either PAM4 mode or NRZ mode.

As shown in FIG. 3A, DFE 308 can include a sampling circuit 310 having samplers (e.g., slicers or comparators) 311, 312, and 313. Each of samplers 311, 312, and 313 can include a node (e.g., a supply node) 301 to receive a voltage V1, which can be a supply voltage of DFE 308.

DFE 308 can include circuit paths (e.g., feedback paths) 331, 332, and 333 having circuits (e.g., weighed buffer circuits) 341, 342, and 343, respectively, coupled to a summing circuit 320. Circuits 341, 342, and 343 can be part of a feedback circuit in DFE 308 (like feedback circuit 230 of FIG. 1). For example, circuits 341, 342, and 343 can form a tap (e.g., tap circuit) 380, such that DFE 308 can operate as 1-tap DEF. FIG. 3A shows DFE 308 having one tap (e.g., one tap circuit 380) as an example. However, DFE 308 can include multiple taps (e.g., a multiple of tap circuit 380) coupled to summing circuit 320.

Summing circuit 320 can include an input (e.g., input node or input nodes) 305 to receive signal $V_{IN}$, and an output (e.g., summing nodes) 320s to provide signal Vs. Signal Vs can be provided to inputs (e.g., input nodes) of samplers 311, 312, and 313. Sampler 311 can include an output (e.g., output node or output nodes) 311D to provide output information $TAP_{LOW}$. Sampler 312 can include an output (e.g., output node or output nodes) 312D to provide information $TAP_{MID}$. Sampler 313 can include an output (e.g., output node or output nodes) 313D to provide information $TAP_{HI}$. Information $TAP_{LOW}$, $TAP_{MID}$, and $TAP_{HI}$ are digital information that can be represented by signals on outputs 311D, 312D, and 313D, respectively. The signals on each of outputs 311D, 312D, and 313D can be differential signals.

In the drawings (e.g., FIG. 2A and FIG. 3A and other figures) described herein, an input or an output of a component (e.g., sampler 311, 312, or 313 or summing circuit 320) is shown as a single conductive line for simplicity. However, such an input (or an output) can include a pair of conductive lines to carry a pair of differential signals that represent the information at such an input (or output). For example, although each of outputs 311D, 312D, and 313D is shown in FIG. 3A as a single conductive line, each of outputs 311D, 312D, and 313D can include two conductive lines to carry two respective differential signals (e.g., a pair of differential signals). In another example, although output (e.g., summing nodes) 320s of summing circuit 320 is shown as a single conductive line, output 320s can include two conductive lines to carry to two respective differential signals (e.g., a pair of differential signals).

In FIG. 3A, samplers 311, 312, and 313 can operate like samplers 211, 212, and 213, respectively, of FIG. 2A. For example, samplers 311, 312, and 313 can operate to compare signal Vs (e.g., PAM4 signal) in with their respective reference thresholds Vref1, Vref2, and Vref3 based on timing information provided by clock signal CLK. Reference thresholds Vref1, Vref2, and Vref3 can be the same as those of FIG. 2A. Samplers 311, 312, and 313 can generate information $TAP_{LOW}$, $TAP_{MID}$, and $TAP_{HI}$, respectively, based on the comparisons. Information $TAP_{LOW}$, $TAP_{MID}$, and $TAP_{HI}$ are similar to (or the same as) information $TAP_{LOW}$, $TAP_{MID}$, and $TAP_{HI}$ respectively, of FIG. 2A. For example, the combination of information $TAP_{LOW}$, $TAP_{MID}$, and $TAP_{HI}$ from sampling circuit 310 in FIG. 3A can form a 3-bit thermometer code. DFE 308 can include a circuit (not shown, but it can be similar to encoder circuit 225 of FIG. 2A) to determine the value (a binary value of two bits) of information represented by signal Vs in a UI based on the 3-bit thermometer code provided by information $TAP_{LOW}$, $TAP_{MID}$, and $TAP_{HI}$.

As shown in FIG. 3A, information (e.g., $TAP_{LOW}$, $TAP_{MID}$, and $TAP_{HI}$) from respective outputs 311D, 312D, and 313D of samplers 311, 312, and 313 can be provided (e.g., directly provided) to inputs (e.g., input nodes, not labeled) of circuits 341, 342, and 343, respectively. The outputs (e.g., output nodes, not labeled) of circuits 341, 342, and 343 can be coupled to the output (e.g., summing nodes) of summing circuit 320.

In FIG. 3A, label "a" next to each of circuits 341, 342, and 343 indicates a value of a tap weight (DFE tap coefficient) applied by a particular circuit (among circuits 341, 342, and 343) to information at the output of a respective sampler coupled to that particular circuit. As shown in FIG. 3A, circuit 341 can apply tap weight a (DFE tap coefficient having a value of "a") to information $TAP_{LOW}$ at output 311D of sampler 311. Circuit 342 can apply tap weight a (DFE tap coefficient having a value of "a") to information $TAP_{MID}$ at output 312D of sampler 312. Circuit 343 can apply tap weight a (DFE tap coefficient having a value of "a") to information $TAN_{HI}$ at output 313D of sampler 313. Thus, DFE 308 can apply a uniform (the same) tap weight (e.g., tap weight a) on circuit paths (e.g., feedback paths) 331, 332, and 333 of circuit path (e.g., feedback path) that are coupled to summing circuit 320.

As described above, DFE 308 of FIG. 3A is configured to operate in PAM4 mode. Thus, in PAM4 mode of DFE 308, DFE 308 can apply tap weight 3a (total tap weight) to the information ($TAP_{LOW}$, $TAP_{MID}$, and $TAP_{HI}$) on the combination of circuit paths 331, 332, and 333 coupled to summing circuit 320.

In NRZ mode (described below), the same tap weight (e.g., tap weight 3a) can be applied to output information from sampling circuit 310 to maintain proper operation of DFE 308. However, as described in more detail below, some portion of DFE 308 can be deactivated (e.g., powered down (e.g., turned off)) to save power in NRZ mode in comparison with PAM4 mode.

FIG. 3B shows DFE 308 of FIG. 3A configured to operate in NRZ mode, according to some embodiments described herein. As shown in FIG. 3B, in NRZ mode, the components in portions 391 and 393 of DFE 308 can be deactivated (e.g., powered down) to save power. For example, samplers 311 and 313 and circuits 341 and 343 can be deactivated in NRZ mode. Deactivating a particular component (or a portion) of a DFE (e.g., DFE 308) in NRZ mode can include disconnecting (e.g., turned off) power (e.g., voltage V1), a clock signal (e.g., signal CLK), or both the power and the clock signal provided to that particular component (the component being deactivated). For example, deactivating samplers 311 and 313 can include disconnecting power (e.g., voltage V1) provided to samplers 311 and 313, disconnecting (e.g., disabling) a clock signal (e.g., clock signal CLK) provided to respective samplers 311 and 313, or disconnecting both the power and the clock signal provided to samplers 311 and 313.

In NRZ mode, DFE 308 can apply the same tap weight (e.g., tap weight 3a) to output information from sampling circuit 310 to provide feedback information to summing circuit 320 to maintain proper operation of DFE 308. As shown in FIG. 3B, since portions 391 and 393 of DFE 308 are deactivated in NRZ mode, circuit 342 (which is not deactivated in NRZ mode) can be configured to apply a tap weight 3a (as indicated by "3a" next to circuit 342 in FIG. 3B) to information (output information) $TAP_{MID}$ on circuit path 332 coupled to summing circuit 320.

Thus, the tap weight applied by circuit 342 can be changed from tap weight a (FIG. 3A) in PAM4 mode to tap weight 3a (FIG. 3A) in NRZ mode. As described above, DFE 308 can be included in receiver 120 of device 102 (FIG. 1). Therefore, control unit 160 of device 102 can be configured (e.g., by changing the value of information CTL in register circuit 161) to cause the tap weight applied by circuit 342 to change from tap weight a in PAM4 mode (FIG. 3A) to tap weight 3a in NRZ mode (FIG. 3B).

Sampler 312 (FIG. 3B) can have similar operation in NRZ mode and PAM4 mode. In NRZ mode, while samplers 311 and 313 are deactivated, sampler 312 can be activated (or remain activated) to sample signal Vs and compare it with reference threshold Vref2 and generate information $TAP_{MID}$ at output 312D. In NRZ mode, signal Vs is an NRZ signal (instead of a PAM4). Thus, information $TAP_{MID}$ at output 312D can provide one bit (e.g., binary 0 ("0") or binary 1 "1")) for each symbol in signal Vs in a UI.

Thus, as described above, DFE 308 in PAM4 mode (FIG. 3A) can apply tap weight 3a (total tap weight) to output information (e.g., information $TAP_{LOW}$, $TAP_{MID}$, and $TAP_{HI}$) from sampling circuit 310 to summing circuit 320. In NRZ mode, DFE 308 (FIG. 3B) can also apply tap weight 3a (total tap weight) to output information (e.g., information $TAP_{MID}$) from sampling circuit 310 to summing circuit 320. However, in NRZ mode, some portions (e.g., samplers 311 and 313) of DFE 308 can be deactivated to save power. The description herein uses the ratio a and 3a (associated with tap weight a and tap weight 3a) in PAM4 mode and NRZ mode as an example. However, other ratios can be used, depending on the target voltages (e.g., voltage levels of signal $V_{IN}$ in FIG. 3A and FIG. 3B) in PAM4 mode and NRZ mode.

Figure 4A:
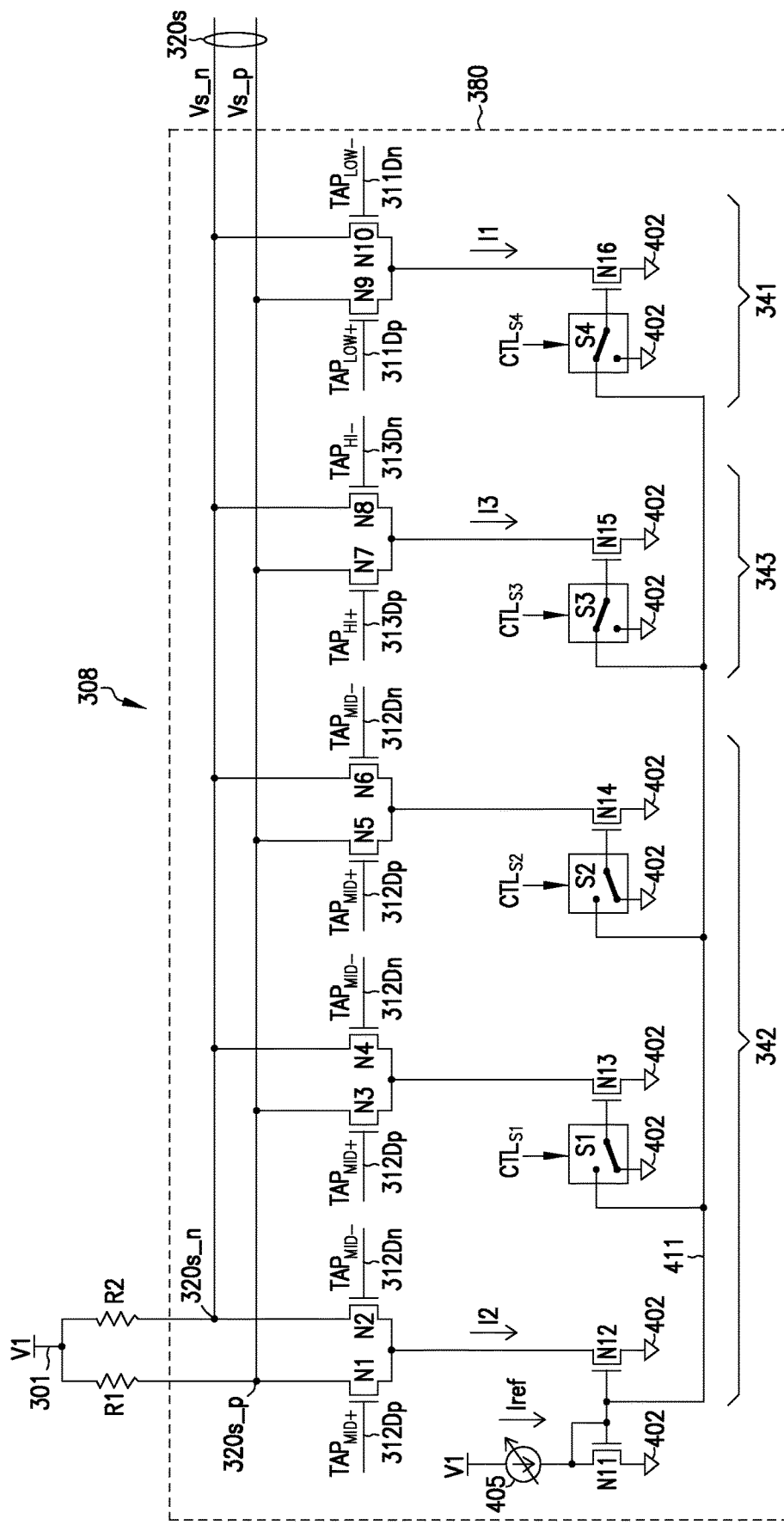
FIG. 4A shows a schematic diagram of a portion of the DFE of FIG. 3A including circuits configured to operate in PAM4 mode, according to some embodiments described herein.

FIG. 4A shows a schematic diagram of a portion of DFE 308 of DFE 308 of FIG. 3A including circuits 341, 342, and 343 configured to operate in PAM4 mode, according to some embodiments described herein. As shown in FIG. 4A, DFE 308 can include transistors N1 through N16, switches S1, S2, S3, and S4, resistors R1 and R2, nodes (e.g., summing nodes) 320s_n and 320s_p, a current source 405, and a ground node 402. Resistors R1 and R2 can be part (e.g., loads) of summing circuit 320 (FIG. 3A). Current source 405, transistor N1, or both can also be part of summing circuit 320. For simplicity, only part of DFE 308 is shown in FIG. 4A.

Nodes 320s_n and 320s_p are collectively shown in FIG. 3A as output (e.g., summing nodes) 320s of summing circuit 320. Signal Vs_n and Vs_p on nodes 320s_n and 320s_p, respectively, are differential signals that can be differential form of signal Vs.

Output (e.g., output nodes) 311Dn and 311Dp are collectively shown in FIG. 3A as output 311D. Information (e.g., signals) $TAP_{LOW+}$ and $TAP_{LOW-}$ can be differential form of information $TAP_{LOW}$ in FIG. 3A. Output (e.g., output nodes) 312Dn and 312Dp are collectively shown in FIG. 3A and as output 312D. Information $TAP_{MID+}$ and $TAP_{MID-}$ can be differential form of information $TAP_{MID}$ in FIG. 3A. Output (e.g., output nodes) 313Dn and 313Dp are collectively shown in FIG. 3A as output 313D. Information $TAP_{HI+}$ and $TAP_{HI-}$ can be differential form of information $TAP_{HI}$ in FIG. 3A.

Supply node 301 and voltage V1 are the same as those shown in FIG. 3A. Current source 405 can be a variable current source. Current source 405 can be configured to provide a current Iref, which can have a value (e.g., a predetermined current amount) to allow circuits 341, 342, and 343 to apply tap weight a to respective information $TAP_{LOW+}/TAP_{LOW-}$, $TAP_{MID+}/TAP_{MID-}$, and $TAP_{HI+}/TAP_{HI-}$. Thus, tap weight a can be based on the value of current Iref.

Switches S1, S2, S3, and S4 can be controlled by information (e.g., control bits) $CTL_{S1}$, $CTL_{S2}$, $CTL_{S3}$, and $CTL_{S4}$, respectively, to couple the gates of transistors N13, N14, N15 and N16, respectively, to either a node 411 or ground node 402, depending on which mode (e.g., PAM4 mode or NRZ mode) DFE 308 operates. Node 411 can be coupled to the gates of transistors N11 and N12. Each of information $CTL_{S1}$, $CTL_{S2}$, $CTL_{S3}$, and $CTL_{S4}$ can have different values (e.g., can be set at different values) based on the mode (e.g., PAM4 mode or NRZ mode) of DFE 308. In PAM4 mode, the values of information $CTL_{S1}$, $CTL_{S2}$, $CTL_{S3}$, and $CTL_{S4}$ can be set, such that switches S1, S2, S3, and S4 can operate to couple the gates of transistors N13 and N14 to ground node 402, and the gates of transistors N15 and N16 to node 411 (as shown in FIG. 4A). For example, in PAM4 mode, the values of information $CTL_{S1}$ and $CTL_{S2}$ can be set at "0" (binary 0), and the values of information $CTL_{S3}$ and $CTL_{S4}$ can be set at "1" (binary 1). As described above, DFE 308 can be included in receiver 120 of device 102 (FIG. 1). Thus, control unit 160 of device 102 can be configured to control (e.g., to cause) DFE 308 to operate in either PAM4 mode or NRZ mode. Information $CTL_{S1}$, $CTL_{S2}$, $CTL_{S3}$, and $CTL_{S4}$ can be part of control information CTL of FIG. 1. Thus, the values of information $CTL_{S1}$, $CTL_{S2}$, $CTL_{S3}$, and $CTL_{S4}$ in FIG. 4A can be set (e.g., stored) in register circuit 161 (FIG. 1) of control unit 160 (e.g., by setting the values for part of control information CTL in register circuit 161).

As shown in FIG. 4A, circuits 341, 342, and 343 can include respective transistors among transistors N1 through N16 and respective switches among switches S1, S2, S3, and S4. In PAM4 mode, the portion of circuit 342 that includes transistors N3, N4, N5, N6, N13, and N14 can be disabled (e.g., by coupling the gates of transistors N13 and N14 to ground node 402, as shown in FIG. 4A). In PAM4 mode, transistor N11 and transistors N12, N15, and N16 can form respective current mirrors to provide corresponding currents I1, I2, and I3 based on current Iref. Tap weight a applied by respective circuits 341, 342, and 343 is based on respective currents I1, I2, and I3, which are based on current Iref. For example, currents I1, I2, and I3 can have the same ratio as current Iref (e.g., I1=I2=I3=kIref, where k is a real number, for example, k can be an integer equal to or greater than one).

As shown in FIG. 4A, current I1 may flow between node 320s_p or 320s_n and ground node 402 through transistor N9 or N10 and transistor N16 based on the values of information $TAP_{LOW+}$ and $TAP_{LOW-}$. Current I2 may flow between node 320s_p or 320s_n and ground node 402 through transistor N1 or N2 and transistor N12 based on the values of information $TAP_{MID+}$ and $TAP_{MID-}$. Current I3 may flow between node 320s_p or 320s_n and ground node 402 through transistor N7 or N8 and transistor N15 based on the values of information $TAP_{HI+}$ and $TAP_{HI-}$. The value of each of currents I1, I2, and I3 can be based on (e.g., equal to) the value of Iref from current source 405. For example, currents I1, I2, and I3 can have the same ratio as current Iref (e.g., I1=I2=I3=kIref). The same current allows a uniform tap weight (e.g., tap weight a) to be applied to information ($TAP_{LOW-}/TAP_{LOW+}$, $TAP_{MID-}/TAP_{MID+}$, and $TAP_{HI-}/TAP_{HI+}$ at outputs of sampling circuit 310 of FIG. 3A).

Thus, in PAM4 mode, tap weight 3a (which is based on currents I1, I2, and I3 in circuits 341, 342, and 343, respectively) can be applied to respective information $TAP_{LOW-}/TAP_{LOW+}$, $TAP_{MID-}/TAP_{MID+}$, and $TAP_{HI-}/TAP_{HI+}$ to provided back information to summing circuit 320 (FIG. 3A).

Figure 4B:
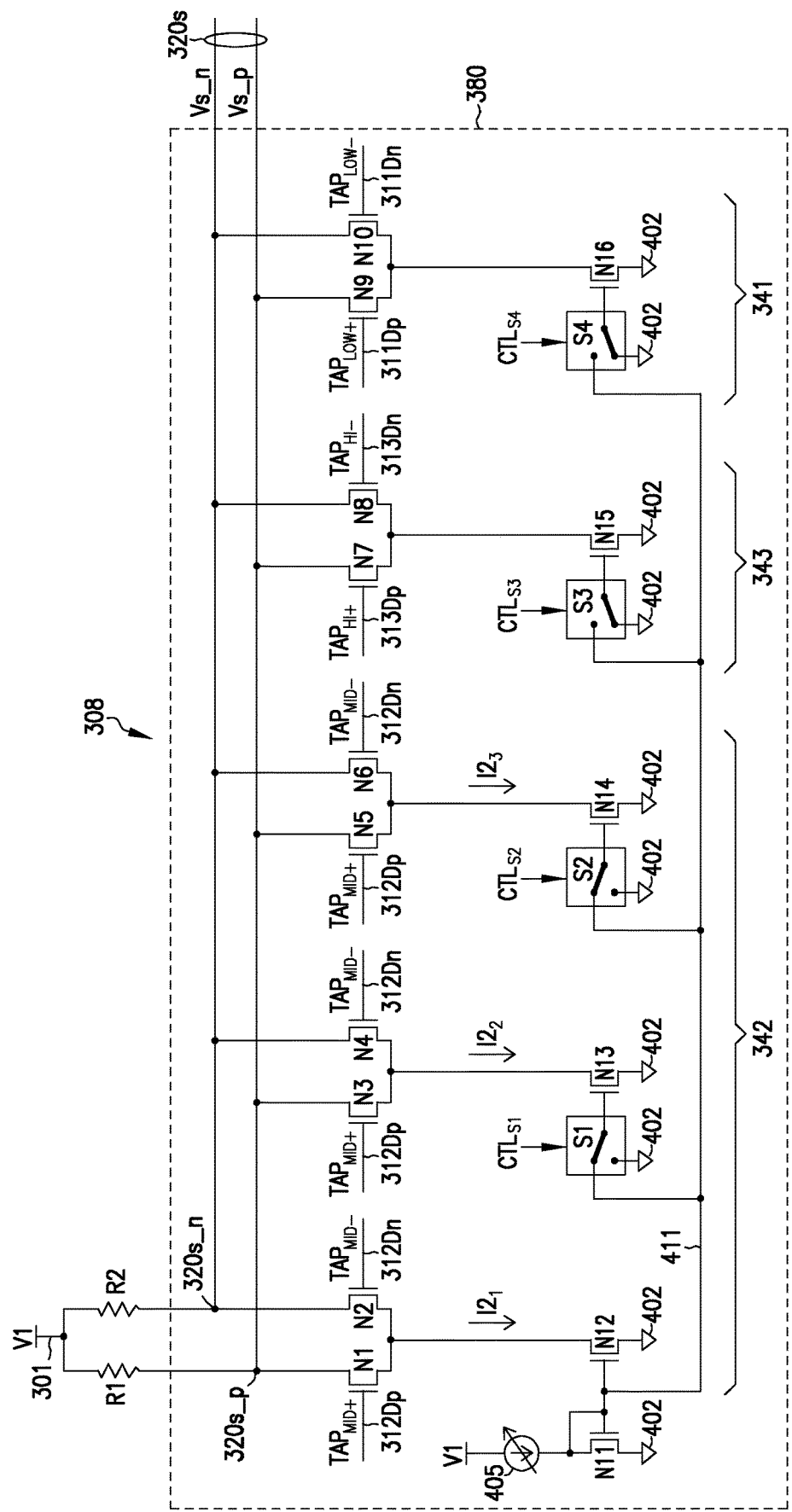
FIG. 4B shows the schematic diagram of the portion of the DFE of FIG. 3A including circuits configured to operate in NRZ mode, according to some embodiments described herein.

FIG. 4B shows the schematic diagram of DFE 308 of FIG. 4A including circuits 341, 342, and 343 configured to operate in NRZ mode, according to some embodiments described herein. As described above with reference to FIG.

3B, samplers 311 and 313 can be deactivated in NRZ mode. Thus, circuits 341 and 343 (FIG. 4B) coupled to the outputs of samplers 311 and 313, respectively, can be deactivated.

In NRZ mode, the values of information $CTL_{S1}$, $CTL_{S2}$, $CTL_{S3}$, and $CTL_{S4}$ can be set to be different from their respective values in PAM4 mode. As described above, register circuit 161 can be used to set (e.g., store) different values for information $CTL_{S1}$, $CTL_{S2}$, $CTL_{S3}$, and $CTL_{S4}$ for different modes (e.g., PAM4 and NRZ modes) of DFE 308. In NRZ mode (FIG. 4B), the values of information $CTL_{S1}$, $CTL_{S2}$, $CTL_{S3}$, and $CTL_{S4}$ can be set such that switches S1, S2, S3, and S4 can operate to couple the gates of transistors N15 and N16 to ground node 402, and the gates of transistors N13 and N14 to node 411. For example, in NRZ mode, information $CTL_{S1}$ and $CTL_{S2}$, can be set at "1", and information $CTL_{S3}$ and $CTL_{S4}$ can be set at "0". Thus, as shown in FIG. 4B, the gates of transistors N13 and N14 can be coupled to node 411, and the gates of transistors N15 and N16 to ground node 402. In this configuration, circuits 341 and 343 can be disabled (e.g., transistors N15 and N16 are turned off). Transistor N11 and transistors N12, N13, and N14 can form respective current mirrors having corresponding currents $I2_1$, $I2_2$, and $I2_3$. Tap weight 3a applied by circuit 342 is based on the combination of currents $I2_1$, $I2_2$, and $I2_3$, which are based on current Iref. For example, currents $I2_1$, $I2_2$, and $I2_3$ can have the same ratio as current Iref (e.g., $I2_1=I2_2=I2_3=kIref$, where k is a real number, for example, k can be an integer equal to or greater than one).

As shown in FIG. 4B, current $I2_1$ may flow between node $320s\_n$ or $320s\_p$ and ground node 402 through transistor N1 or N2 and transistor N12 based on the values of information $TAP_{MID+}$ and $TAP_{MID-}$. Current $I2_2$ may flow between node $320s\_n$ or $320s\_p$ and ground node 402 through transistor N3 or N4 and transistor N13 based on the values of information $TAP_{MID+}$ and $TAP_{MID-}$. Current $I2_3$ may flow between node $320s\_n$ or $320s\_p$ and ground node 402 through transistor N5 or N6 and transistor N14 based on the values of information $TAP_{MID+}$ and $TAP_{MID-}$. The value of each of currents $I2_1$, $I2_2$, and $I2_3$ can be based on the value of Iref from current source 405 (e.g., $I2_1=I2_2=I2_3=kIref$).

Thus, in NRZ mode, tap weight 3a (which is based on currents $I2_1$, $I2_2$, and $I2_3$ in circuit 342) can be applied to information $TAP_{MID+}/TAP_{MID-}$ to provide back information to summing circuit 320 (FIG. 3B).

Thus, as described above with reference to FIG. 4A and FIG. 4B, the tap weight applied by circuit 342 can be changed from tap weight a (FIG. 4A) in PAM4 mode to tap weight 3a (FIG. 4B) in NRZ mode. For example, the values of information $CTL_{S1}$, $CTL_{S2}$, $CTL_{S3}$, and $CTL_{S4}$ in register circuit 161 (FIG. 1) can be set (e.g., changed) to cause the tap weight applied by circuit 342 to change from tap weight a in PAM4 mode (FIG. 4A) to tap weight 3a in NRZ mode (FIG. 4B).

Figure 5A:
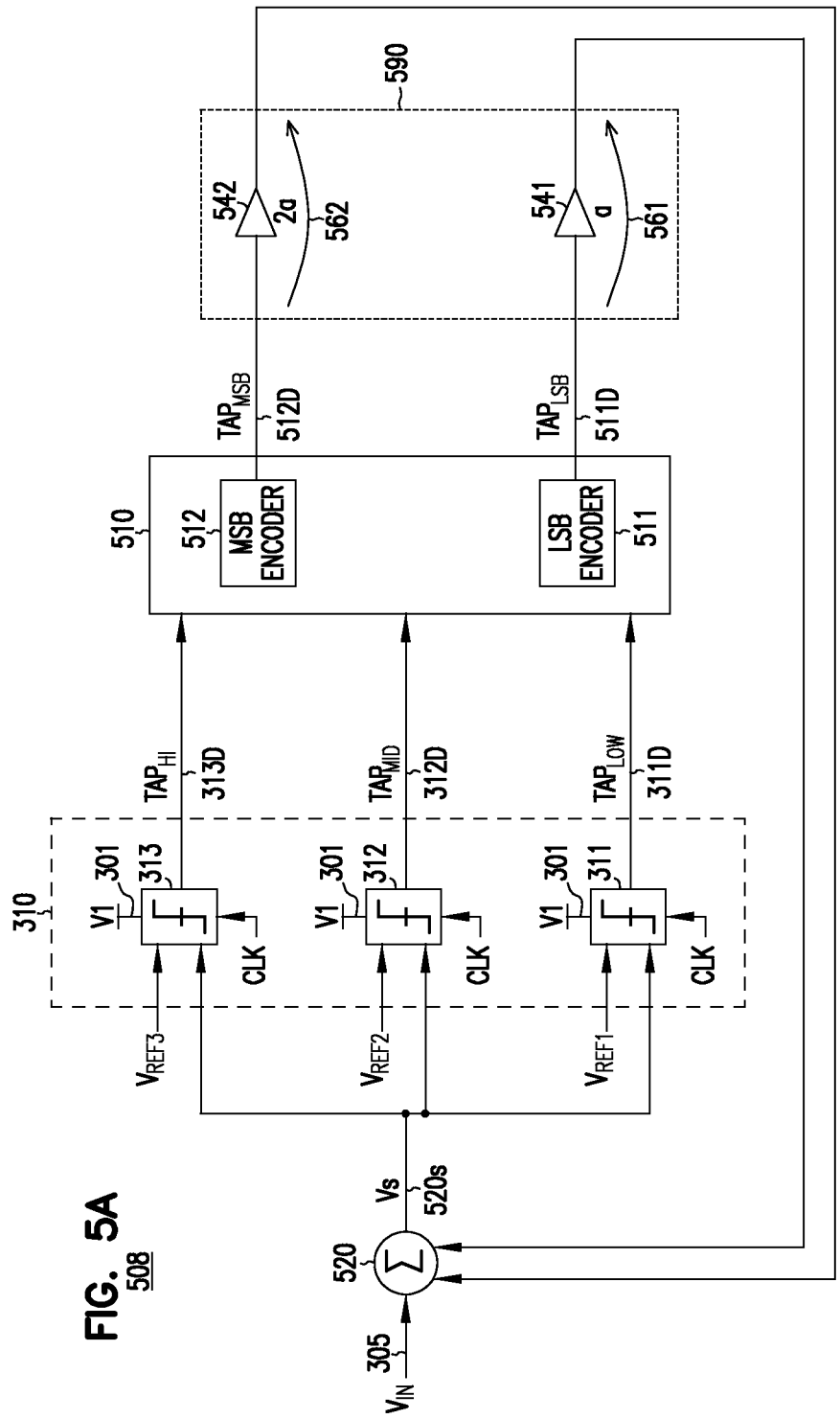
FIG. 5A shows a block diagram of a DFE having a non-uniform tap weight (non-uniform tap coefficient) configured to operate in PAM4 mode, according to some embodiments described herein.

FIG. 5A shows a block diagram of a DFE 508 having a non-uniform tap weight (non-uniform tap coefficient) configured to operate in PAM4 mode, according to some embodiments described herein. DFE 508 can include elements that are similar to or the same as the elements of DFE 308 of FIG. 3A. For simplicity, similar or identical elements between DFE 308 and DFE 508 are given the same labels and their description are not repeated.

DFE 508 of FIG. 5A can be configured to operate in PAM4 mode to process PAM4 signals and in NRZ mode to process NRZ signals. DFE 508 can be included in receiver 120 of device 102 (FIG. 1) as the DFEs (e.g., DFE $108_0$ and DFE $108_X$) of receiver 120. Thus, control unit 160 of device 102 can control (e.g., can cause) DFE 508 to operate in either PAM4 mode or NRZ mode.

Differences between DFE 308 (FIG. 3A) and DFE 508 (FIG. 5A) include an addition of encoder circuit 510 and circuits 541 and 542 in DFE 508. As described above in DFE 308, feedback information provided to summing circuit 320 can be provided directly from the outputs of sampling circuit 310. In DFE 508, feedback information provided to summing circuit 520 can be provided from encoder circuit 510 (e.g., and not from the outputs of sampling circuit 310).

Circuits 541 and 542 can be included in circuit paths (e.g., feedback paths) 561 and 562, respectively, that can be part of a feedback circuit in DFE 308 (like feedback circuit 230 of FIG. 1). For example, circuits 541 and 542 can form a tap (e.g., tap circuit) 590, such that DFE 508 can operate as 1-tap DEF. FIG. 5A shows DFE 508 having one tap (e.g., one tap circuit 590) as an example. However, DFE 508 can include multiple taps (e.g., a multiple of tap circuit 590) coupled to summing circuit 520.

As shown in FIG. 5A, summing circuit 520 can include input (e.g., input node or input nodes) 305 to receive signal $V_{IN}$, and an output 520s to provide signal Vs to sampling circuit 310. Samplers 311, 312, and 313 of sampling circuit 310 can operate to sample signal Vs and generate information $TAP_{LOW}$, $TAP_{MID}$, and $TAP_{HI}$, respectively.

Encoder circuit 510 can include an LSB encoder 511 and an MSB encoder 512. Encoder circuit 510 can operate like encoder circuit 225 of FIG. 2A. For example, LSB encoder 511 and MSB encoder 512 can operate to receive information $TAP_{LOW}$, $TAP_{MID}$, and $TAP_{HI}$ (e.g., 3-bit thermal code) from respective outputs 311D, 312D, and 313D of samplers 311, 312, and 313, respectively. LSB encoder 511 and MSB encoder 512 can generate information $TAP_{LSB}$ and $TAP_{MSB}$ at outputs (e.g., output nodes) 511D and 512D, respectively, based on information from outputs 311D, 312D, and 313D. The combination of information $TAP_{LSB}$ and $TAP_{MSB}$ at outputs 511D and 512D, respectively, can provide two bits (e.g., "00", "01" "10" or "11") included (e.g., encoded) in each symbol in signal Vs in a UI.

DFE 508 can apply non-uniform (e.g., binary) tap weights (e.g., tap weight a and tap weight 2a) to information $TAP_{LSB}$ and $TAP_{MSB}$, respectively, on circuit paths (e.g., feedback paths) 561 and 562, respectively, to provide feedback information to summing circuit 520. For example, circuit 541 can operate to apply tap weight a to information $TAP_{LSB}$ to provide feedback information from circuit path (e.g., feedback path) 561 to summing circuit 520. Circuit 542 can operate to apply tap weight 2a to information $TAP_{MSB}$ to provide feedback information from circuit path (e.g., feedback path) 562 to summing circuit 520.

As described above, DFE 508 of FIG. 5A is configured to operate in PAM4 mode. Thus, in PAM4 mode of DFE 508, DFE 508 can apply tap weight 3a (total tap weight) to the information ($TAP_{LSB}$ and $TAP_{MSB}$) on the combination of circuit paths 561 and 562 coupled to summing circuit 520.

In NRZ mode (described below), the same tap weight (e.g., tap weight 3a) can be applied to output information from encoder circuit 510 to maintain proper operation of DFE 508. However, as described in more detail below, some portion of DFE 508 can be deactivated to save power in NRZ mode in comparison with PAM4 mode.

Figure 5B:
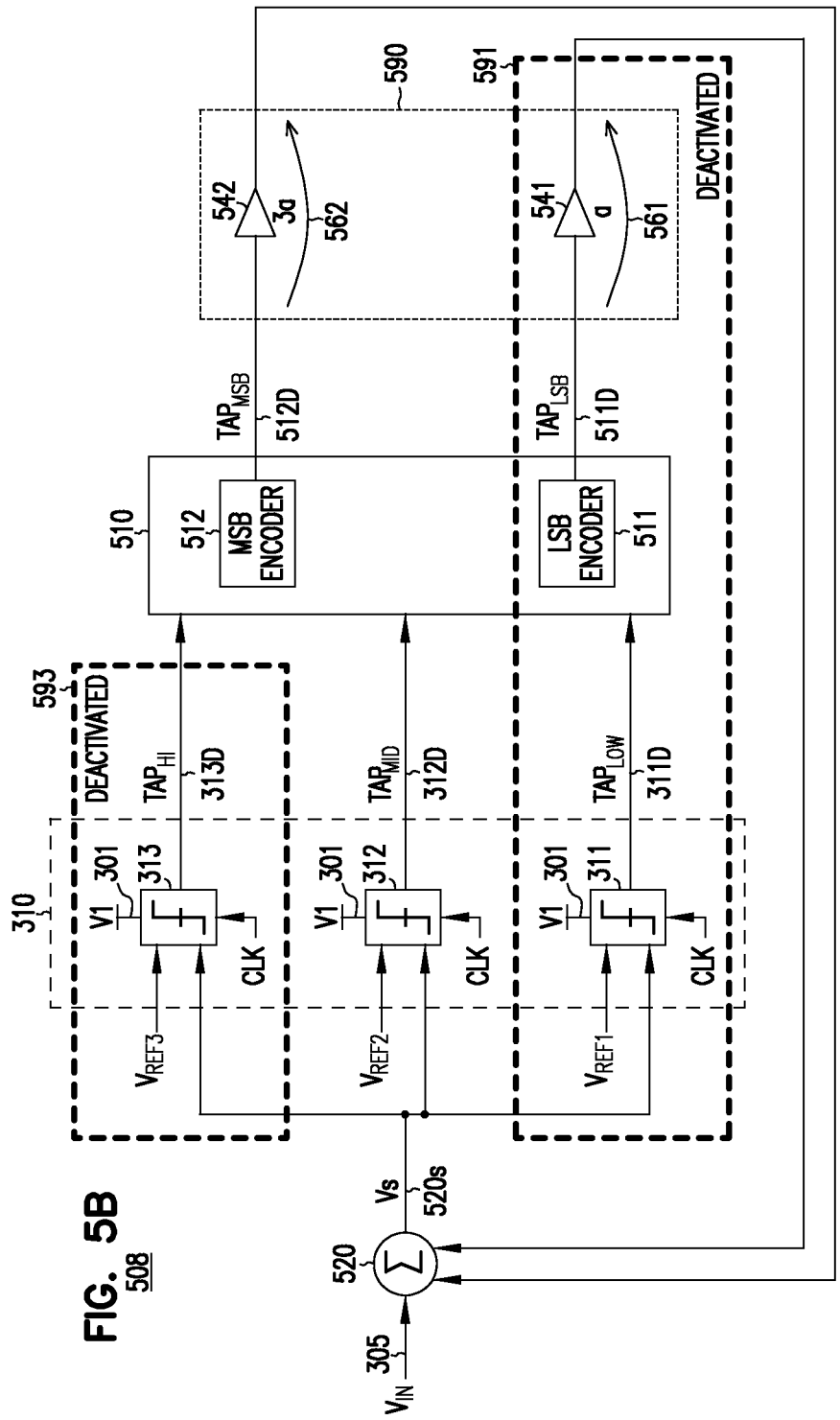
FIG. 5B shows the block diagram of the DFE of FIG. 5A configured to operate in NRZ mode, according to some embodiments described herein.

FIG. 5B shows DFE 508 of FIG. 5A configured to operate in NRZ mode, according to some embodiments described herein. As shown in FIG. 5B, in NRZ mode, the components in portions 591 and 593 of DFE 508 can be deactivated (e.g., powered down) to save power. For example, samplers 311 and 313, encoder 511, and circuit 541 can be deactivated in NRZ mode. Deactivating a particular component (or a portion) of a DFE (e.g., DFE 308) in NRZ mode can include disconnecting (e.g., turning off) power (e.g., voltage V1), a clock signal (e.g., signal CLK), or both the power and the clock signal provided to that particular component (the component being deactivated). For example, deactivating samplers 311 and 313 of DFE 508 can include disconnecting power (e.g., voltage V1) provided to samplers 311 and 313, disconnecting (e.g., disabling) a clock signal (e.g., clock signal CLK) provided to respective samplers 311 and 313, or disconnecting both the power and the clock signal provided to samplers 311 and 313. In another example, deactivating encoder 511 can include disconnecting power (e.g., voltage V1) provided to encoder 511, disconnecting (e.g., disabling) a clock signal (e.g., clock signal CLK) provided to encoder 511, disconnecting both the power and the clock signal provided to encoder 511.

In NRZ mode, DFE 508 can apply the same tap weight (e.g., tap weight 3a) to output information from encoder circuit 510 to provide feedback information to summing circuit 520 to maintain proper operation of DFE 508. As shown in FIG. 5B, since portions 591 and 593 of DFE 508 are deactivated in NRZ mode, circuit 542 (which is not deactivated in NRZ mode) can be configured to apply tap weight 3a (as shown in FIG. 5B) to information (output information) $TAP_{MSB}$ on respective circuit paths 562 coupled to summing circuit 520.

Thus, the tap weight applied by circuit 542 can be changed from tap weight 2a (FIG. 5A) in PAM4 mode to tap weight 3a (FIG. 5B) in NRZ mode. As described above, DFE 308 can be included in receiver 120 of device 102 (FIG. 1). Therefore, control unit 160 of device 102 can be configured (e.g., by changing the value of information CTL in register circuit 161) to cause the tap weight applied by circuit 542 to change from tap weight 2a in PAM4 mode (FIG. 5A) to tap weight 3a in NRZ mode (FIG. 5B).

Sampler 312 (FIG. 5B) of DFE 508 can have similar operation in NRZ mode and PAM4 mode. In NRZ mode, while samplers 311 and 313 are deactivated, sampler 312 can be activated (or remain activated) to sample signal Vs and compare it with reference threshold Vref2 and generate information $TAP_{MID}$ at output 312D. In NRZ mode, signal Vs is an NRZ signal (instead of a PAM4). Thus, information $TAP_{MID}$ at output 312D can provide one bit (e.g., binary 0 or binary 1) for each symbol in signal Vs in a UI.

Thus, as described above, DFE 508 in PAM4 mode (FIG. 5A) can apply tap weight 3a (total tap weight) to output information (e.g., information $TAP_{LSB}$ and $TAP_{MSB}$) from encoder circuit 510 to summing circuit 520. In NRZ mode, DFE 508 (FIG. 5B) can also apply tap weight 3a (total tap weight) to output information (e.g., information $TAP_{MSB}$) from encoder circuit 510 to summing circuit 520. However, in NRZ mode, some portions (e.g., samplers 311 and 313, and LSB encoder 511) of DFE 508 can be deactivated to save power. The description herein uses the ratio a and 3a (associated with tap weight a and tap weight 3a) in PAM4 mode and NRZ mode as an example. However, other ratios can be used, depending on the target voltages (e.g., voltage levels of signal $V_{IN}$ in FIG. 5A and FIG. 5B) in PAM4 mode and NRZ mode.

Figure 6A:
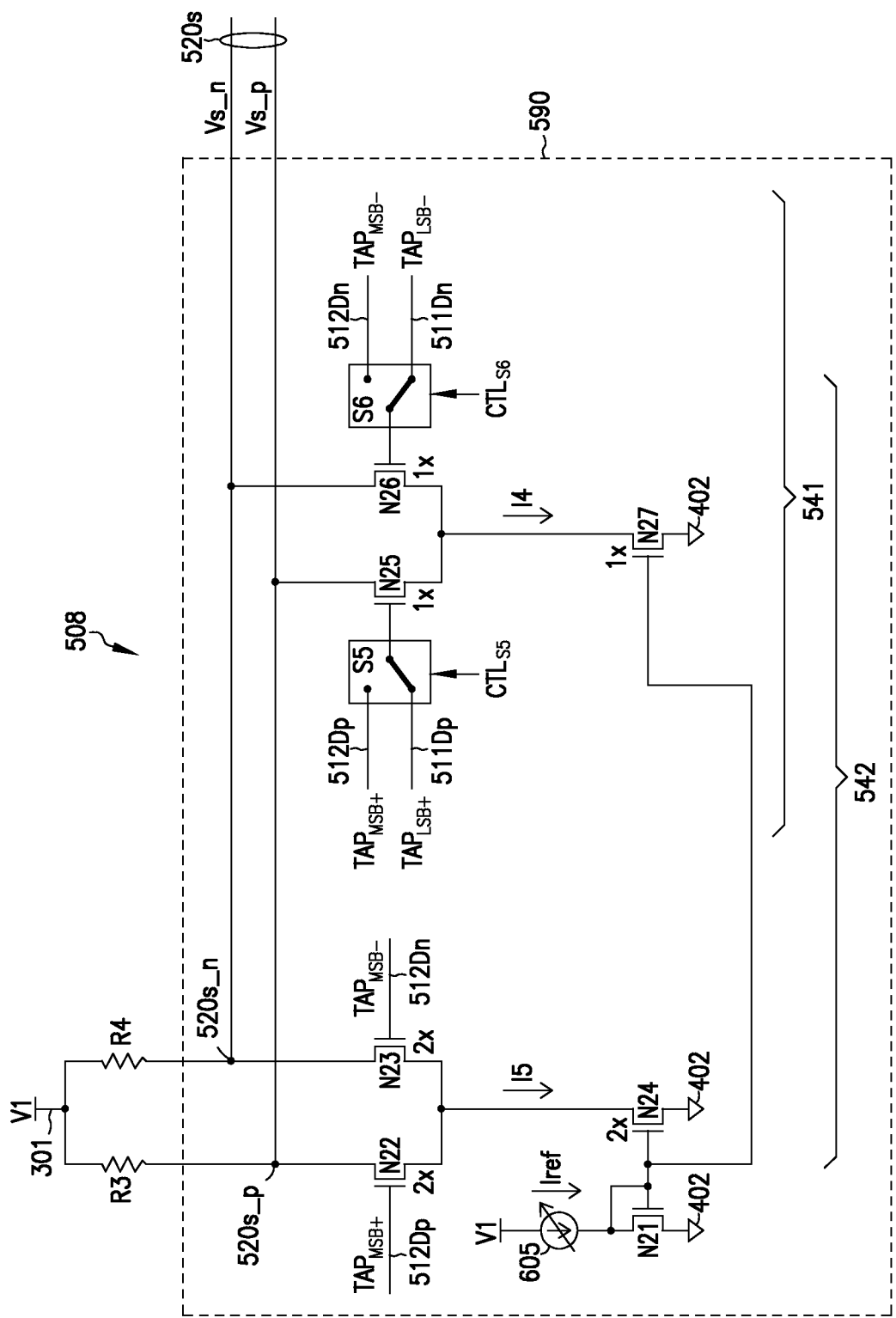
FIG. 6A shows a schematic diagram of a portion of the DFE of FIG. 5A including circuits configured to operate in PAM4 mode, according to some embodiments described herein.

FIG. 6A shows a schematic diagram of a portion of DFE 508 of FIG. 6A including circuits 541 and 542 configured to operate in PAM4 mode, according to some embodiments described herein. As shown in FIG. 6A, DFE 508 can include transistors N21 through N27, switches S5 and S6, resistors R3 and R4, nodes (e.g., summing nodes) 520s_n and 520s_p, and a current source 605. Resistors R1 and R2 can be part (e.g., loads) of summing circuit 520 (FIG. 5A). Current source 605, transistor N1, or both can also be part of summing circuit 520. For simplicity, only part of DFE 508 is shown in FIG. 6A.

Nodes 520s_n and 520s_p are collectively shown in FIG. 6A as output (e.g., summing nodes) 520s of summing circuit 520. Signal Vs_n and Vs_p on nodes 520s_n and 520s_p, respectively, are differential signals that can be differential form of signal Vs.

Outputs (e.g., output nodes) 511Dn and 511Dp are collectively shown in FIG. 5A as output 511D. Information $TAP_{LSB+}$ and $TAP_{LSP-}$ can be the differential form of information $TAP_{LSB}$. Outputs (e.g., output nodes) 512Dn and 512Dp are collectively shown in FIG. 5A and as output 512D. Information $TAP_{MSB+}$ and $TAP_{MSB-}$ can be the differential form of information $TAP_{MSB}$.

Supply node 301 and voltage V1 are the same as those shown in FIG. 5A. Current source 605 can be a variable current source. Current source 605 can be configured to provide a current Iref, which can have a value (e.g., a predetermined current amount) to allow circuits 541 and 542 to apply tap weight a and tap weight 2a, respectively, to respective information $TAP_{LSB+}$/$TAP_{LSB-}$ and $TAP_{MSB+}$/$TAP_{MSB}$. Thus, tap weight a and tap weight 2a can be based on the value of current Iref.

Switches S5 and S6 can be controlled by information (e.g., control bits) $CTL_{S5}$ and $CTL_{S6}$, respectively. Each of information $CTL_{S5}$ and $CTL_{S6}$ can have different values (e.g., can be set at different values) based on the mode (e.g., PAM4 mode or NRZ mode) of DFE 508. In PAM4 mode, the values of information $CTL_{S5}$ and $CTL_{S6}$ can be set, such that switches S5 and S6 can operate to couple the gates of transistors N25 and N26, respectively, to outputs (e.g., output nodes) 511Dp and 511Dn, respectively. For example, in PAM4 mode, the values of information $CTL_{S5}$ and $CTL_{S6}$ can be set at "0". As described above, DFE 508 can be included in receiver 120 of device 102 (FIG. 1). Thus, control unit 160 of device 102 can be configured to control (e.g., to cause) DFE 508 to operate in either PAM4 mode or NRZ mode. Information $CTL_{S5}$ and $CTL_{S6}$ can be part of control information CTL of FIG. 1. Thus, the values of information $CTL_{S5}$ and $CTL_{S6}$ in FIG. 6A can be set (e.g., stored) in register circuit 161 (FIG. 1) of control unit 160 (e.g., by setting the values for part of control information CTL in register circuit 161).

As shown in FIG. 6A, circuit 541 can include transistors N25, N26, and N27, and switches S5 and S6. Circuit 542 can include transistors N22, N23, and N24. Circuits 541 and 542 can share N25, N26, and N27, and switches S5 and S6.

In PAM4 mode, transistor N21 and transistors N24 and N27 can form part of respective current mirrors to provide corresponding currents I4 and I5 based on current Iref. Tap weight a and tap weight 2a applied by respective circuits 541 and 542 are based on respective currents I4 and I5, which are based on current Iref. For example, currents I4 and Iref can have same value (e.g., I4=Iref), and current I5 can be greater (e.g., two times greater) than current Iref (e.g., I5=2Iref). In another example, currents I4, I5, and Iref can have relationships such that I4=kIref and I5=2(kIref), where k is a real number (e.g., k can be an integer equal to or greater than one).

As shown in FIG. 6A, current I4 may flow between node 520s_p or 520s_n and ground node 402 through transistor N25 or N26 and transistor N27 based on the values of information $TAP_{LSB+}$ and $TAP_{LSB-}$. Current I5 may flow between node 520s_p or 520s_n and ground node 402 through transistor N22 or N23 and transistor N24 based on the values of information TAP$_{MSB+}$ and TAP$_{MSB-}$. Currents I4 and I5 can have different (e.g., unequal) values. For example, the value of current I5 be greater than (e.g., two times greater) than the value of current I4. Different values of currents I4 and I5 allow non-uniform tap weights (e.g., tap weight a and tap weight 2a) to be applied to information (TAP$_{LSB+}$/TAP$_{LSB-}$ and TAP$_{MSB}$/TAP$_{MSB-}$) at outputs 511D of encoder circuit 510 (FIG. 5A).

Transistors N21 through N27 can be configured (e.g., sized), such that currents I4 and I5 can have different values. For example, transistors N22, N23, and N24 can be configured (e.g., sized) such that the value of current I5 can be two times the value of current I4. FIG. 6A shows label 2x associated with transistors N22, N23, and N24, and label 1x associated with transistors N25, N26, and N27 to indicate that each of transistors N22, N23, and N24 can have a size (e.g., channel length) that can be two times greater than the size (e.g., channel length) of each of transistors N25, N26, and N27. In this example, transistor N21 can have the same size as transistors N25, N26, and N27.

As described above with reference to FIG. 5A, DFE 508 in PAM4 mode can apply non-uniform tap weight a and tap weight 2a (for a total equal to tap weight 3a) to information TAP$_{LSB+}$/TAP$_{LSB-}$ and TAP$_{MSB}$/TAP$_{MSB-}$ on respective circuit paths 561 and 562 coupled to summing circuit 520. In FIG. 6A, tap weight a can be applied by the operation of circuit 541 (based on the configuration of circuit 541 shown in FIG. 6A) and tap weight 2a can be applied by the operation of circuit 542 (based on the configuration of circuit 542 shown in FIG. 6A). Thus, in PAM4 mode, tap weight 3a (which is based on currents I4 and I5 in circuits 541 and 542, respectively) can be applied to respective information TAP$_{LSB+}$/TAP$_{LSB-}$ and TAP$_{MSB}$/TAP$_{MSB-}$ to provided back information to summing circuit 520 (FIG. 5A).

Figure 6B:
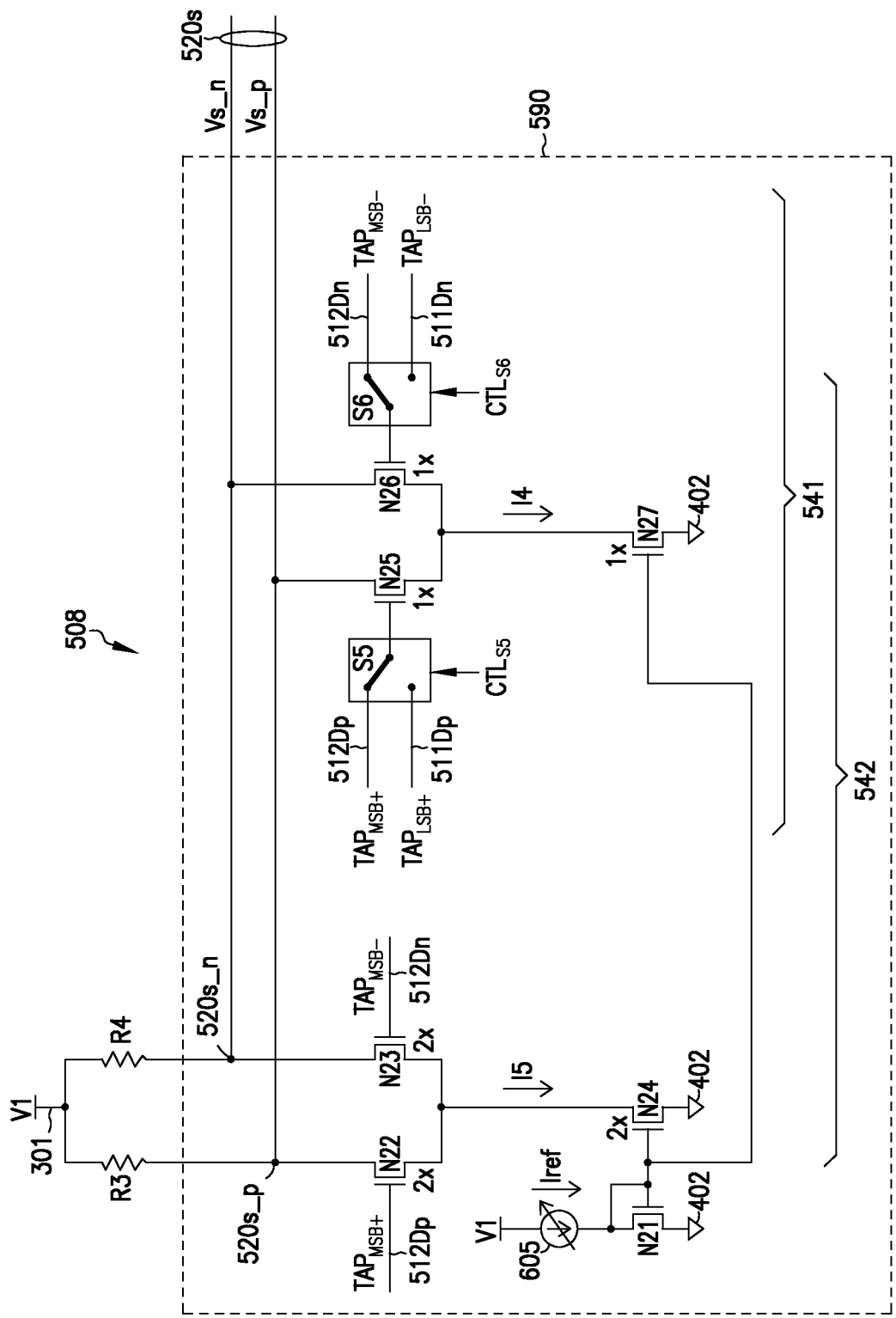
FIG. 6B shows the block diagram of the DFE of FIG. 6A configured to operate in NRZ mode, according to some embodiments described herein.

FIG. 6B shows a schematic diagram of a portion of DFE 508 of FIG. 6A configured to operate in NRZ mode, according to some embodiments described herein. In NRZ mode, the values of information CTL$_{S5}$ and CTL$_{S6}$ can be set to be different from their values in PAM4 mode. As described above, register circuit 161 can be used to set (e.g., store) different values for information CTL$_{S5}$ and CTL$_{S6}$ for different modes (e.g., PAM4 and NRZ modes) of DFE 508. In NRZ mode, the values of information CTL$_{S1}$ and CTL$_{S6}$ can be set such that switches S5 and S6 can operate to couple the gates of transistors N25 and N26, respectively, to outputs (e.g., output nodes) 512Dp and 512Dn, respectively. For example, in NRZ mode, information CTL$_{S5}$ and CTL$_{S6}$ can be set at "1". The values of information CTL$_{S5}$ and CTL$_{S6}$ in FIG. 6B can be set (e.g., stored) in register circuit 161 of control unit 160.

In NRZ mode, transistor N21 and transistors N24 and N27 can form part of respective current mirrors to provide corresponding currents I5 and I6 based on current Iref. Tap weight 3a applied by circuit 542 is based on respective currents I5 and I6, which are based on current Iref. For example, currents I6 and Iref can have the same value (e.g., I6=Iref), and current I5 can be greater (e.g., two times greater) than current Iref (e.g., I5=2Iref). In another example, currents I5, I6, and Iref can have relationships such that I6=kIref and I5=2kIref), where k is a real number, for example, k can be an integer equal to or greater than one.

Like current I5 of FIG. 6A, current I5 of FIG. 6B may flow between node 520s_p or 520s_n and ground node 402 through transistor N21 or N22 and transistor N24 based on the values of information TAP$_{MSB+}$ and TAP$_{MSB-}$. Current I6 may flow between node 520s_p or 520s_n and ground node 402 through transistor N25 or N26 and transistor N27. However, since the gates of transistors N25 and N26 are coupled to outputs (e.g., output nodes) 512Dp and 512Dn, current I6 may flow between node 520s_p or 520s_n and ground node 402 through transistor N25 or N26 and transistor N27 based on the values of information TAP$_{MSB+}$ and TAP$_{MSB-}$ at outputs 512Dp and 512Dn, respectively.

Currents I5 and I6 can have different (e.g., unequal) values. For example, the value current I5 can be greater than (e.g., two times greater than) the value of current I6.

In FIG. 6B, tap weight 3a can be applied by the operation of circuit 542 (based on the configuration of DFE 508 shown in FIG. 6B). For example, tap weight 3a (which is based on currents I5 and I6 of circuit 542) can be applied to information TAP$_{MSB-}$/TAP$_{MSB+}$ to provide back information to summing circuit 520 (FIG. 5B).

Thus, as described above with reference to FIG. 6A and FIG. 6B, the tap weight applied by circuit 542 can be changed from tap weight 2a (FIG. 6A) in PAM4 mode to tap weight 3a (FIG. 6B) in NRZ mode (FIG. 6B). For example, the values of information CTL$_{S5}$ and CTL$_{S6}$ in register circuit 161 (FIG. 1) can be set (e.g., changed) to cause the tap weight applied by circuit 542 to change from tap weight 2a in PAM4 mode (FIG. 6A) to tap weight 3a in NRZ mode (FIG. 6B).

Figure 7A:
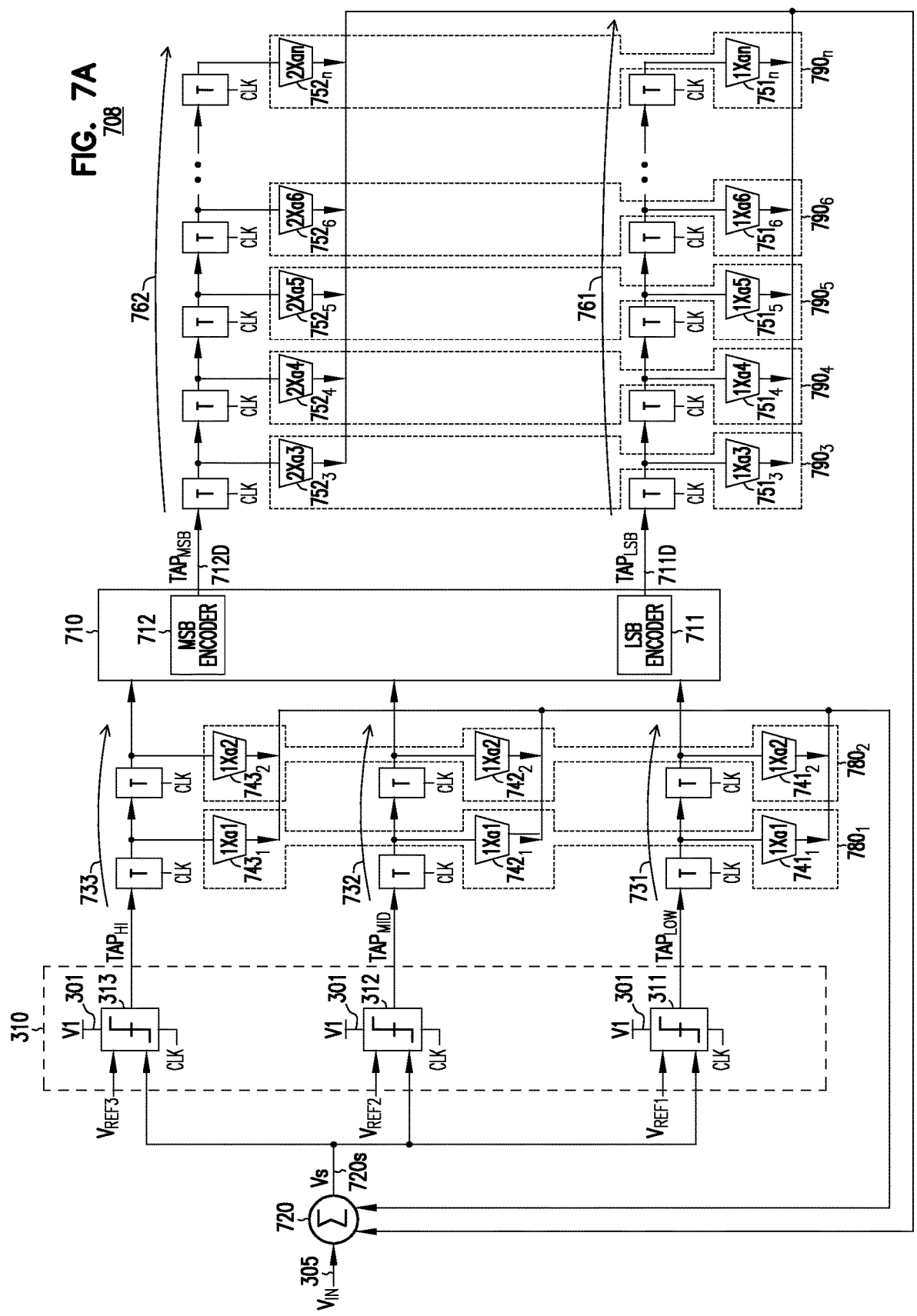
FIG. 7A shows a block diagram of a DFE having multi-tap circuits configured to operation in PAM4 mode, according to some embodiments described herein.

FIG. 7A shows a block diagram of a DFE 708 having multi-tap circuits configured to operation in a PAM4 mode, according to some embodiments described herein. DFE 708 of FIG. 7A can be configured to operate in PAM4 mode to process PAM4 signals and in NRZ mode to process NRZ signals. DFE 708 (FIG. 7A) can be included in receiver 120 of device 102 (FIG. 1) as the DFEs (e.g., DFE 108$_0$ and DFE 108$_X$) of receiver 120. Thus, control unit 160 of device 102 can control (e.g., can cause) DFE 708 to operate in either mode PAM4 mode or NRZ mode.

DFE 708 can include elements (e.g., sampling circuit 310) that are similar to or the same as the elements of DFE 308 (FIG. 3A) and DFE 508 (FIG. 5A). For simplicity, similar or identical elements between DFE 308, DFE 508, and DFE 708 are given the same labels and their descriptions are not repeated. DFE 708 can include similar elements as DFE 508 (FIG. 508). However, DFE 708 can include additional elements (e.g., delay circuits T and associated tap circuits, described below) and be structured to operate as a multi-tap DFE. For example, as shown in FIG. 7A, DFE 708 can include taps (e.g., tap circuits) 780$_1$, 780$_2$, and 790$_3$ through 790$_n$.

FIG. 7A shows DFE 708 having two taps (e.g., tap circuits 780$_1$ and 780$_2$) coupled to (e.g., coupled between) sampling circuit 310 and summing circuit 720 as an example. However, DFE 708 can have a different number of taps (e.g., fewer than two taps or more than two taps) coupled to sampling circuit 310 and summing circuit 720.

Each of taps 780$_1$ and 780$_2$ in FIG. 7A can include elements (e.g., transistor and switches) similar to (or the same as) tap 380 (FIG. 4A and FIG. 4B). Thus, in PAM4 mode (FIG. 7A), the elements of each of taps 780$_1$ and 780$_2$ can be configured to operate like tap 380 in FIG. 4A. In NRZ mode (FIG. 7B) as described below, each of taps 780$_1$ and 780$_2$ can be configured to operate like tap 380 in FIG. 4B.

Each of taps 790$_3$ through 790$_n$ can include elements (e.g., transistor and switches) similar to (or the same as) tap 590 (FIG. 6A and FIG. 6B). Thus, in PAM4 mode, the elements of each of taps 790$_3$ through 790$_n$ can be configured to operate like tap 590 in FIG. 6A. In NRZ mode (FIG. 7B) as described below, each of taps 790$_3$ through 790$_n$ can be configured to operate like tap 590 in FIG. 6B.

As shown in FIG. 7A, DFE 708 can include sampling circuit 310, an encoder circuit 710 having LSB encoder 711 and MSB encoder 712, a summing circuit 720, and circuit paths (e.g., feedback paths) 731, 732, 733, 761, and 762. Sampling circuit 310 can generate information $TAP_{LOW}$, $TAP_{MID}$, and $TAP_{HI}$ at respective outputs (not labeled) of samplers 311, 312, and 313 based on sampling of signal VS. Encoder 711 and MSB encoder 712 can generate information $TAP_{LSB}$ and $TAP_{MSB}$ (based on information $TAP_{LOW}$, $TAP_{MID}$, and $TAP_{HI}$) at respective outputs 711D and 712D of LSB encoder 711 and MSB encoder 712, respectively. Summing circuit 720 can include input (e.g., input node or input nodes) 305 to receive signal $V_{IN}$, and an output (e.g., summing nodes) 720s to provide signal Vs based on signal $V_{IN}$ and feedback information provided by circuit paths 731, 732, 733, 761, and 762.

As shown in FIG. 7A, circuit paths 731, 732, and 733 can be coupled to summing circuit 720 and respective output nodes of samplers 311, 312, and 313. Circuit paths 761 and 762 can be coupled to summing circuit 720 and respective outputs 711D and 712D of LSB encoder 711 and MSB encoder 712, respectively.

Each of circuit paths 731, 732, 733, 761, and 762 can include respective delay circuits T and circuits (e.g., weight buffer circuits) 741₁, 742₁, 743₁, 741₂, 742₂, 743₂, 751₃ through 751ₙ, and 752₃ through 752ₙ. These delay circuits and weight buffer circuits can be part of a feedback circuit of DFE 708 that can be similar to feedback circuit 230 of DFE 208 of FIG. 2A.

As shown in FIG. 7A, delay circuits T can be coupled in series with each other in respective circuit paths (e.g., feedback paths) 731, 732, 733, 761, and 762. Delay circuits T can operate based on timing of clock signal CLK. Each delay circuit T can delay a propagation of a signal on a respective circuit path (among circuit paths 731, 732, 733, 761, and 762) by a unit time delay (by an amount of time). The unit time delay can be based on (e.g., can be equal to) the period clock signal CLK.

Each of circuits 741₁, 742₁, 743₁, 741₂, 742₂, 743₂, 751₃ through 751ₙ, and 752₃ through 752ₙ can be coupled to the output (e.g., output node or output nodes, not labeled) of a respective delay circuit T. Each of circuits 741₁, 742₁, 743₁, 741₂, 742₂, 743₂, 751₃ through 751ₙ, and 752₃ through 752ₙ on a particular circuit path (e.g., one of circuit paths 731, 732, 733, 761, and 762) can apply a different tap weight to information (e.g., output signal) at the output of a respective delay circuit on that particular circuit path. The values of the tap weights applied by circuits 741₁, 742₁, 743₁, 741₂, 742₂, 743₂, 751₃ through 751ₙ, and 752₃ through 752ₙ are indicated by respective tap weights 1Xa1, 1Xa2, 1Xa3 through 1Xan, and 2Xa3 through 2Xan, wherein "n" can be the number of DFE taps (e.g., tap 1 through tap n) used to applied a tap weight to information included in a UI of signal $V_{IN}$. The number of DFE taps can be a combination of delay circuits T and corresponding circuits 741₁, 742₁, 743₁, 741₂, 742₂, 743₂, 751₃ through 751ₙ, and 752₃ through 752ₙ. In the description herein, "X" of tap weight (e.g., 1Xa1, 2Xa3, and 3Xa3) stands for multiplication (times).

In FIG. 7A, each of circuits 741₁, 742₁, and 743₁ can apply tap weight 1Xa. Each of circuits 741₂, 742₂, and 743₂ can apply tap weight 1Xa2, which is different from (unequal to) tap weight 1Xa1. Circuits 751₃ through 751ₙ can apply tap weights 1Xa3 through 1Xan, respectively. Circuits 753₃ through 751ₙ can apply tap weights 2Xa3 through 2Xan, respectively.

Circuits 741₁, 742₁, and 743₁ (included in tap 780₁) can include elements (e.g., transistors and switches), connections, and operations similar to those of circuits 341, 342, and 343, respectively, of FIG. 4A. Circuits 741₂, 742₂, and 743₂ (included in tap 780₂) can include elements (e.g., transistors and switches) and connections similar to those of circuits 341, 342, and 343, respectively, of FIG. 4A.

Circuits 751₃ and 752₃ (included in tap 790₃) can include elements (e.g., transistors and switches), connections, and operations similar to those of circuits 541 and 542, respectively, of FIG. 6A. Circuits 751₄ and 752₄ (included in tap 790₄) can include elements (e.g., transistors and switches) and connections similar to those of circuits 541 and 542, respectively, of FIG. 6A. In a similar pattern, circuits 751₅ and 752₅ (included in tap 790₅) and circuits 751₆ and 752₆ (included in tap 790₆) through circuits 751ₙ and 752ₙ ((included in tap 790ₙ) can include elements (e.g., transistors and switches) and connections similar to those of circuits 541 and 542, respectively.

In FIG. 7A, the arrow signs at respective circuits 741₁, 742₁, 743₁, 741₂, 742₂, 743₂, 751₃ through 751ₙ, and 752₃ through 752ₙ indicate the output (e.g., output nodes) of these circuits. As shown in FIG. 7A, these outputs be coupled to summing circuit 720 (e.g., coupled to the summing nodes of summing circuit 720) through respective circuit paths (e.g., feedback paths) 731, 732, 733, 761, and 762.

In operation, sampling circuit 310 can sample signal Vs, which is PMA4 signal in the configuration of DFE 708 in FIG. 7A. Circuit paths 731, 732, and 733 can apply tap weights 1Xa1, 1Xa1, and 1Xa1, respectively, (applied by tap 780₁) and tap weights 1Xa2, 1Xa2, and 1Xa2, respectively, (applied by tap 780₂) to respective information $TAP_{LOW}$, $TAP_{MID}$, and $TAP_{HI}$. Thus, in PAM4 mode (FIG. 7A) a total tap weight 3Xa1 (applied by tap 780₁) and a total tap weight 3Xa2 (applied by tap 780₂) can be applied to information $TAP_{LOW}$, $TAP_{MID}$, and $TAP_{HI}$ by respective taps (e.g., tap 780₁ and tap 780₂) on circuit paths 731, 732, and 733.

Circuit paths 761 and 762 can apply tap weights 1Xa3 and 2Xa3 (applied by tap 790₃), respectively, tap weights 1Xa4 and 2Xa4 (applied by tap 790₄), respectively, tap weights 1Xa5 and 2Xa5 (applied by tap 790₅), respectively, and tap weights 1Xa6 and 2Xa6 through tap weights 1Xan and 2Xan (applied by taps 790₆ through 790ₙ, respectively) to respective information $TAP_{LSB}$ and $TAP_{MSB}$. Thus, in PAM4 (FIG. 7A) a total tap weight 3Xa3 (applied by tap 790₃), a total tap weight 3Xa4 (applied by tap 790₄), a total tap weight 3Xa5 (applied by tap 790₅), and a total tap weight 3Xa6 through a total tap weight 3Xan (applied by taps 790₆ through 790ₙ, respectively) can be applied to information $TAP_{LSB}$ and $TAP_{MSB}$ by respective taps (e.g., taps 790₃ through 790ₙ) on circuit paths 761 and 762.

In NRZ mode (described below), to maintain proper operation of DFE 708, the same total tap weight (e.g., tap weights 3Xa1 and 3Xa2) can be applied (e.g., applied by taps 780₁ and 780₂) to output information from sampling circuit 310 to summing circuit 720. The same total tap weight (e.g., tap weights 3Xa3, 3Xa4, 3Xa5, and 3Xa6 through 3Xan) can be applied to the output information from encoder circuit 710 to summing circuit 720. However, as described in more detail below, some portion of DFE 708 can be deactivated to save power in NRZ mode in comparison with PAM4 mode.

FIG. 7B shows DFE 708 of FIG. 7A configured to operate in NRZ mode, according to some embodiments described herein. In NRZ mode, the components in portions 791 and 793 of DFE 708 can be deactivated (e.g., powered down) to save power. For example, samplers 311 and 313, and encoder 711 can be deactivated in NRZ mode. Delay circuits T in portions 791 and 793 and circuits 741$_1$, 743$_1$, 741$_2$, 743$_2$, and 751$_3$ through 751$_n$ in respective portions 791 and 793 can also be deactivated.

Deactivating a particular component (or a portion) of DFE 708 in NRZ mode can include disconnecting (e.g., turning off) power (e.g., voltage V1), a clock signal (e.g., signal CLK), or both the power and the clock signal provided to that particular component (the component being deactivated). For example, deactivating samplers 311 and 313 of DFE 708 can include disconnecting power (e.g., voltage V1) provided to samplers 311 and 313, disconnecting (e.g., disabling) a clock signal (e.g., clock signal CLK) provided to respective samplers 311 and 313, or disconnecting both the power and the clock signal provided to samplers 311 and 313. In another example, deactivating encoder 711 can include disconnecting power (e.g., voltage V1) provided to encoder 711, disconnecting (e.g., disabling) a clock signal (e.g., clock signal CLK) provided to encoder 711, disconnecting both the power and the clock signal provided to encoder 711. In another example, deactivating delay circuits T in portions 791 and 793 can include disconnecting power (e.g., voltage V1) provided to these delay circuits T (which are the delay circuit T being deactivated), disconnecting clock signal CLK provided to these delay circuits T, or disconnecting both power and clock signals provided to these delay circuits T.

In NRZ mode, to provide the same feedback information (as in PAM4 mode) to summing circuit 720 in order to maintain proper operation of DFE 708, DFE 708 can apply the same total tap weight (e.g., tap weighs 3Xa1 and 3Xa2) to output information of sampling circuit 310 to summing circuit 720. DFE 708 can also apply the same total tap weight (e.g., tap weighs 3Xa3, 3Xa4, 3Xa5, and 3Xa6 through 3Xan) to output information from encoder circuit 710 to summing circuit 720.

Since portions 791 and 793 are deactivated in NRZ mode, circuit path 732 (which is not deactivated in NRZ mode) can be configured to apply tap weights 3Xa1 and 3Xa2 (as shown in FIG. 7B) to information TAP$_{MID}$ from the output of sampler 312 to provide feedback information to summing circuit 720. Circuit path 762 (which is not deactivated in NRZ mode) can be configured to apply tap weight 3Xa3, 3Xa4, 3Xa5, and 3Xa6 through 3Xan (as shown in FIG. 7B) to information TAP$_{MSB}$ from the output of MSB encoder 712 to provide feedback information to summing circuit 720.

Thus, the tap weight applied by circuits 742$_1$ and 742$_2$ on circuit path 732 can be changed from tap weight 1Xa1 and 1Xa2 (FIG. 7A), respectively, in PAM4 to tap weights 3Xa1 and 3xa2 (FIG. 7B), respectively, in NRZ mode. The tap weights applied by circuits 752$_3$ through 752$_n$ on circuit path 762 can be changed from tap weights 2Xa3, 2Xa4, 2Xa5, and 2Xa6 through 2Xan (FIG. 7A), respectively, in PAM4 mode to tap weights 3Xa3, 3Xa4, 3Xa5, and 3Xa6 through 3Xan (FIG. 7B), respectively, in NRZ mode. As described above, DFE 708 can be included in receiver 120 of device 102 (FIG. 1). Therefore, control unit 160 of device 102 can be configured (e.g., by changing the value of information CTL in register circuit 161) to cause the tap weights applied by circuits 742$_1$ and 742$_2$ to change between PAM4 and NRZ mode, and to cause the tap weights applied by circuits 752$_3$ through 752$_n$ to change between PAM4 and NRZ mode.

Sampler 312 (FIG. 7B) of DFE 708 can have similar operation in NRZ mode and PAM4 mode. In NRZ mode, while samplers 311 and 313 are deactivated, sampler 312 can be activated (or remain activated) to sample signal Vs and compare it with reference threshold Vref2 and generate information at output of sampler 312 and provide it to circuit path 732 for use to provide feedback information to summing circuit 720.

As described above, each of circuits 742$_1$ and 742$_2$ can include elements (e.g., transistors and switches) and connections and operations similar to those of circuits 342 of FIG. 4A. Thus, circuits 742$_1$ and 742$_2$ (FIG. 7A and FIG. 7B) can be configured differently in PAM4 mode (FIG. 7A) and NRZ mode (FIG. 7B) like circuit 342 (FIG. 4A and FIG. 4B) to allow the tap weights applied by circuits 742$_1$ and 742$_2$ to change (e.g., to be reconfigured) between PAM4 mode and NRZ mode.

As described above, each of circuits 752$_3$ through 752$_2$ can include elements (e.g., transistors and switches), connections, and operations similar to those of circuit 542 (FIG. 6A and FIG. 6B). Thus, circuits 752$_3$ through 752$_n$ (FIG. 7A and FIG. 7B) can be configured differently in PAM4 mode (FIG. 7A) and NRZ mode (FIG. 7B) like circuit 542 (FIG. 6A and FIG. 6B) to allow the tap weights applied by circuits 752$_3$ through 752$_n$ to change (e.g., to be reconfigured) between PAM4 mode and NRZ mode.

Configuring DFE 708 as described above (e.g., deactivating the components in portions 791 and 793) can allow DFE 708 to save power in NRZ mode in comparison with PAM4 mode.

Figure 8:
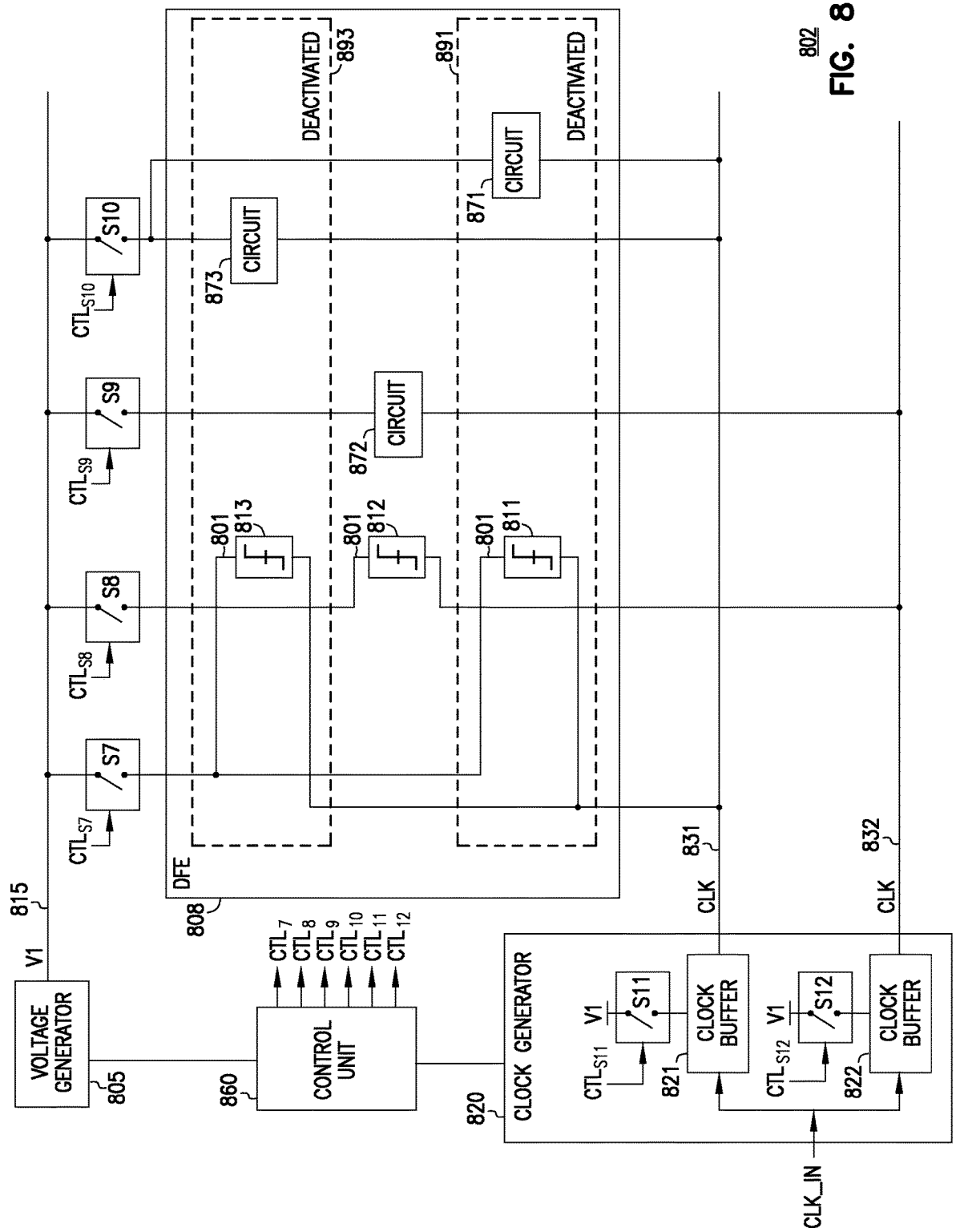
FIG. 8 shows a device including a DFE, a voltage generator, and clock circuitry, according to some embodiments described herein.

FIG. 8 shows a device 802 including a DFE 808, a voltage generator 805, and a clock generator 820, according to some embodiments described herein. Device 802 can correspond to device 102 of FIG. 1. For example, DFE 808 can be can be included in device 102 (FIG. 1) as the DFEs (e.g., DFE 108$_0$ and DFE 108$_X$) of receiver 120 of device 102. As shown in FIG. 8, device 802 can include a control unit 860 that can be similar to (or the same as) control unit 160 of FIG. 1. For example, control unit 860 can be configured to cause DFE 808 to operate in PAM4 mode or in NRZ mode. In another example, control unit 860 can provide information CTL$_7$ through CTL$_{S12}$ that can be used to control switches S7 through S12, respectively, as described in more detail below.

Device 802 can include other components (e.g., other DFEs) similar to device 102 of FIG. 1 that are omitted from FIG. 8 for simplicity. DFE 808 can include any of the DFEs described above with reference to FIG. 2A through FIG. 7B. For example, DFE 808 can include DFE 208 (FIG. 2A), DFE 308 (FIG. 3A), DFE 508 (FIG. 5A) or DFE 708 (FIG. 7A). Thus, like any of the DFEs described above with reference to FIG. 1 through FIG. 6B, DFE 808 can be configured to operate in PAM4 mode to process PAM4 signals and in NRZ mode to process NRZ signals.

FIG. 8 shows DFE 808 configured to operate in NRZ mode. As shown in FIG. 8, portions 891 and 893 of DFE 808 can be deactivated in NRZ mode like any of the DFEs described above with reference to FIG. 2A through FIG. 7B.

As shown in FIG. 8, DFE 808 can include samplers 811, 812, and 813 that can be similar to (or the same as) samplers 311, 312, and 313, respectively, described above with reference to FIG. 3 through FIG. 7B. Each of samplers 811, 812, and 813 can include a supply node 801 to receive voltage V1 and a clock node (not labeled) to receive a clock signal CLK.

In FIG. 8, each of circuits 871, 872, and 873 can include components of DFE 808 that can be similar to or the same as some of the components of the DFEs described above with reference to FIG. 2A through FIG. 7B, for example, delay circuits T, encoders (e.g., encoders 551 and 711), weighted buffer circuits, and other components of the DFEs described above with reference to FIG. 2A through FIG. 7B.

As shown in FIG. 8, device 802 can include switches S7, S8, S9, and S10 that can be controlled by information $CTL_{S7}$, $CTL_{S8}$, $CTL_{S9}$, and $CTL_{S10}$, respectively. In PAM4 mode, switches S7, S8, S9, and S10 can be turned on to couple supply nodes 801 of samplers 811, 812, and 813, and circuits 871, 872, and 873, to node 815, which can provide power (e.g., voltage V1). Thus, in PAM4 mode, power (e.g., voltage V1) can be connected to samplers 811, 812, and 813, and circuits 871, 872, and 873. In NRZ mode, switches S7 and S10 be turned off to disconnect supply node 801 of samplers 811 and 813 from node 815 and disconnect circuits 871 and 873 from node 815. Thus, power (e.g., voltage V1) is disconnected from samplers 811 and 813, and circuits 871 and 873 in NRZ mode. As shown in FIG. 8, device 802 can include switches S7, S8, S9, and S10 that can be controlled by information $CTL_{S7}$, $CTL_{S8}$, $CTL_{S9}$, and $CTL_{S10}$, respectively. In a power-down mode (e.g., DFE power-down mode of DFE 808), switches S7, S8, S9, and S10 can be turned off to disconnect supply nodes 801 of samplers 811, 812, and 813, and circuits 871, 872, and 873, from node 815, thereby disconnecting power (e.g., voltage V1) from samplers 811, 812, and 813, and circuits 871, 872, and 873.

As shown in FIG. 8, clock generator 820 can include clock buffers 821 and 822 to receive input clock signal CLK_IN to generate clock signal CLK at nodes (e.g., output nodes) 831 and 832 of clock buffers 821 and 822, respectively. Clock signal CLK can be based on clock signal CLK_IN. For example, clock signal CLK can have the same phase, the same frequency, or both as clock signal CLK_IN.

As shown FIG. 8, device 802 can include switches S11 and S12 that can be controlled by information $CTL_{11}$ and $CTL_{S12}$, respectively. Switches S11 and S12 can be controlled by information $CTL_{11}$ and $CTL_{S12}$ such that power (e.g., voltage V1) can be connected to clock buffers 821 and 822 through switches S11 and S12, respectively, when switches S11 and S12 are turned on. Power can be disconnected from clock buffers 821 and 822 when switches S11 and S12 are turned off. Clock signal CLK at node 831 can be activated (e.g., oscillating) when switch S11 is turned on. Clock signal CLK at node 831 can be deactivated (e.g., not oscillating (e.g., remaining at the same level) when switch S11 is turned off. Similarly, clock signal CLK at node 832 can be activated (e.g., oscillating) when switch S12 is turned on. Clock signal CLK at node 832 can be deactivated (e.g., not oscillating (e.g., remaining at the same level)) when switch S12 is turned off.

In PAM4 mode, switches S11 and S12 can be turned on to activate clock signal CLK at each of nodes 831 and 832 and provide clock signal CLK to samplers 811, 812, and 813, and circuits 871, 872, and 873. In NRZ mode, switch S11 can be turned off to deactivate clock signal CLK at node 831 (or stop oscillating clock signal CLK at node 831). Thus, in NRZ mode, clock signal CLK is disconnected from samplers 811 and 813, and circuits 871 and 873. In NRZ mode, switch S12 can be turned on (or remains turned on) to activate clock signal CLK at node 832. Thus, in NRZ mode, clock signal CLK is provided to (e.g., is connected to) sampler 812 and circuits 872. In a power-down mode (e.g., DFE power-down mode of DFE 808), switches S11 and S12 can be turned off to disconnect clock signal CLK from samplers 811, 812, and 813, and circuits 871, 872, and 873 (e.g., switches S11 and S12 can be turned off to prevent clock signal CLK from being provided to each of nodes 831 and 832).

Thus, as described above, the components of DFE 808 in portions 891 and 893 can be deactivated (e.g., by disconnecting power, clock signal, or both to those components) in NRZ mode to save power.

The illustrations of the apparatuses (e.g., apparatus 100, and any of the DFEs described above with reference to FIG. 1 through FIG. 8) and methods (e.g., operations of apparatus 100 and operations of any of the DFEs described above with reference to FIG. 1 through FIG. 8) described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

In the detailed description and the claims, a list of items joined by the term "one of" can mean only one of the listed items. For example, if items A and B are listed, then the phrase "one of A and B" means A only (excluding B), or B only (excluding A). In another example, if items A, B, and C are listed, then the phrase "one of A, B, and C" means A only, B only, or C only. Item A can include a single element or multiple elements. Item B can include a single element or multiple elements. Item C can include a single element or multiple elements.

In the detailed description and the claims, a list of items joined by the term "at least one of" can mean any combination of the listed items. For example, if items A and B are listed, then the phrase "at least one of A and B" means A only, B only, or A and B. In another example, if items A, B, and C are listed, then the phrase "at least one of A, B, and C" means A only; B only; C only; A and B (excluding C); A and C (excluding B); B and C (excluding A); or all of A, B, and C. Item A can include a single element or multiple elements. Item B can include a single element or multiple elements. Item C can include a single element or multiple elements.

ADDITIONAL NOTES AND EXAMPLES

Example 1 includes subject matter (such as a device, an electronic apparatus (e.g., circuit, electronic system, or both), or a machine) including multiple samplers in a decision feedback equalizer (DFE), the multiple samplers including at least two samplers, the samplers configured to be activated in a first mode of the DFE to receive first input information from a summing circuit in the first mode of the DFE, at least one sampler of the multiple samplers configured to be deactivated in a second mode of the DFE, and a selected sampler among the multiple samplers configured to be activated in the second mode of the DFE to receive second input information from the summing circuit.

In Example 2, the subject matter of Example 1 may optionally include, wherein the first input information includes signals encoded with multiple bits within one unit interval (UI), and the second input information includes signals encoded with a single bit within one UI In Example 3, the subject matter of Example 1 may optionally include, wherein the first input information includes signals encoded with a 4-level pulse-amplitude modulation (PAM4) signaling protocol, and the second input information includes signals encoded with a signaling protocol different from PAM4 signaling protocol.

In Example 4, the subject matter of Example 3 may optionally include, wherein the signaling protocol different from PAM4 signaling protocol includes a non-return-to-zero (NRZ) signaling protocol.

In Example 5, the subject matter of Example 1 may optionally include, further comprising a tap circuit coupled to an output of the summing circuit, wherein the tap circuit is configured to apply a first tap weight to a first signal on the output of the summing circuit in the first mode of the DFE, and apply a second tap weight to a second signal on the output of the summing circuit in the second mode of the DFE, wherein the second tap weight is greater than the first tap weight.

In Example 6, the subject matter of Example 5 may optionally include, wherein the second tap weight is three times greater than the first tap weight.

In Example 7, the subject matter of Example 5 may optionally include, wherein the second tap weight is 1.5 times greater than the first tap weight.

In Example 8, the subject matter of Example 1 may optionally include, further comprising a first transistor coupled on a first circuit path between an output of the summing circuit and a ground node, a second transistor coupled on a second circuit path between the output of the summing circuit and the ground node, a first switch to couple a gate of the first transistor to a gate of a third transistor in the second mode and to couple the gate of the first transistor to the ground node in the first mode, and a second switch to couple a gate of the second transistor to the gate of the third transistor in the second mode and to couple the gate of the first transistor to the ground node in the first mode.

In Example 9, the subject matter of Example 1 may optionally include, further comprising a first encoder coupled to the summing circuit, a second encoder coupled to the summing circuit, a transistor coupled on a circuit path between an output of the summing circuit and a ground node, and a switch to couple a gate of the transistor to an output of the first encoder in the first mode and to couple the gate of the transistor to an output of the second encoder in the second mode.

In Example 10, the subject matter of Example 1 may optionally include, further comprising an encoder coupled to a circuit path between an output of one of the multiple samplers and the encoder, wherein the encoder is configured to be activated in the first mode of the DFE, and configured to be deactivated in the second mode of the DFE.

In Example 11, the subject matter of Example 1 may optionally include, further comprising a delay circuit coupled to an output of the at least one sampler, wherein the delay circuit is configured to be activated in the first mode of the DFE, and configured to be deactivated in the second mode of the DFE.

In Example 12, the subject matter of Example 1 may optionally include, wherein each sampler of the multiple samplers includes a node to receive a supply voltage from a supply node, and wherein the node of the at least one sampler of the multiple samplers is configured to be decoupled from the supply node in the second mode of the DFE, and the node of the selected sampler is to be coupled to the supply node in the second mode of the DFE.

In Example 13, the subject matter of Example 1 may optionally include, wherein each sampler of the multiple samplers includes a node to receive a clock signal from a clock generator in the first mode of the DFE, wherein the clock generator is configured to deactivate the clock signal provided to the least one sampler of the multiple samplers in the second mode of the DFE.

Example 14 includes subject matter (such as a device, an electronic apparatus (e.g., circuit, electronic system, or both), or a machine) including a summing circuit, a first sampler in a decision feedback equalizer (DFE) coupled to the summing circuit, the first sampler configured to be deactivated in a mode of the DFE, a second sampler in the DFE coupled to the summing circuit, the second sampler configured to be activated in the mode of the DFE to receive input information from the summing circuit, and a third sampler in the DFE coupled to the summing circuit, the third sampler configured to be deactivated in the mode of the DFE.

In Example 15, the subject matter of Example 14 may optionally include, further comprising a tap circuit coupled to an output of the summing circuit, wherein the tap circuit is configured to apply a first tap weight to a first signal on the output of the summing circuit in the mode of the DFE, and apply a second tap weight to a second signal on the output of the summing circuit in an additional mode of the DFE, wherein the second tap weight is greater than the first tap weight.

In Example 16, the subject matter of Example 15 may optionally include, wherein the second tap weight is three times greater than the first tap weight.

In Example 17, the subject matter of Example 15 may optionally include, wherein the second tap weight is 1.5 times greater than the first tap weight.

In Example 18, the subject matter of Example 14 may optionally include, wherein each of the first, second, and third samplers is configured to be activated in an additional mode of the DFE to receive an additional input information from the summing circuit.

In Example 19, the subject matter of Example 14 may optionally include, further comprising an encoder circuit coupled to the first, second, and third samplers, a first group of delay circuits coupled to a first output of the encoder circuit and coupled in series with each other, each delay circuit in the first group of delay circuits configured to be coupled to a supply voltage in the mode of the DFE, and a second group of delay circuits coupled to a second output of the encoder circuit and coupled in series with each other, each delay circuit in the second group of delay circuits configured to be decoupled from the supply voltage in the mode of the DFE.

In Example 20, the subject matter of Example 19 may optionally include, wherein the second group of delay circuits is configured to be coupled to the supply voltage in an additional mode of the DFE.

In Example 21, the subject matter of Example 14 may optionally include, further comprising a first tap circuit coupled to the first sampler and the summing circuit, a second tap circuit coupled to the second sampler and the summing circuit, and a third tap circuit coupled to the third sampler and the summing circuit, wherein each of the first, second, and third tap circuits is configured to apply a first tap weight to a first signal on an output of the summing circuit in the mode of the DFE, the second tap circuit is configured to apply a second tap weight to a second signal on the output of the summing circuit in an additional mode of the DFE, and the second tap weight is greater than the first tap weight.

In Example 22, the subject matter of Example 21 may optionally include, wherein the summing circuit is configured to receive signals encoded with non-return-to-zero (NRZ) signaling protocol in the mode of the DFE, and configured to receive signals encoded with a 4-level pulse-amplitude modulation (PAM4) signaling protocol in the additional mode of the DFE.

Example 23 includes subject matter (such as a device, an electronic apparatus (e.g., circuit, electronic system, or both), or a machine) including conductive lines on a circuit board, a first device including a transmitter coupled to the conductive lines, and a second device including a receiver coupled to the conductive lines to receive an input signal from the conductive lines, the receiver including a first sampler in a decision feedback equalizer (DFE) configured to be activated in a 4-level pulse-amplitude modulation (PAM4) mode, and configured to be deactivated in a non-return-to-zero (NRZ) mode of the DFE, a second sampler in the DFE configured to be activated in the PAM4 mode of the DFE to receive first input information from a summing circuit, and configured to be activated in the NRZ mode of the DFE to receive second input information from the summing circuit, and a third sampler in the DFE configured to be activated in the PAM4 mode of the DFE to receive the first input information from the summing circuit, and configured to be deactivated in the NRZ mode of the DFE.

In Example 24, the subject matter of Example 23 may optionally include, further comprising a tap circuit coupled to the second sampler and an output of the summing circuit, wherein the tap circuit is configured to apply a first tap weight to a first signal on the output of the summing circuit in the PAM4 mode of the DFE, and apply a second tap weight to a second signal on the output of the summing circuit in the NRZ mode of the DFE, wherein the second tap weight is greater than the first tap weight.

In Example 25, the subject matter of Example 23 may optionally include, wherein the conductive lines are conforming with Peripheral Component Interconnect Express (PCIe) specifications.

The subject matter of Example 1 through Example 25 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   multiple samplers in a decision feedback equalizer (DFE), the multiple samplers including at least two samplers, at least one of the multiple samplers configured to be either activated in a first mode of the DFE to receive first input information from a summing circuit in the first mode of the DFE or activated in a second mode of the DFE to receive second input information from the summing circuit; and
   at least one sampler of the multiple samplers configured to be deactivated in the second mode of the DFE.

2. The apparatus of claim 1, wherein the first input information includes signals encoded with multiple bits within one unit interval (UI), and the second input information includes signals encoded with a single bit within one UI.

3. The apparatus of claim 1, wherein the first input information includes signals encoded with a 4-level pulse-amplitude modulation (PAM4) signaling protocol, and the second input information includes signals encoded with a signaling protocol different from the PAM4 signaling protocol.

4. The apparatus of claim 3, wherein the signaling protocol different from the PAM4 signaling protocol includes a non-return-to-zero (NRZ) signaling protocol.

5. The apparatus of claim 1, further comprising a tap circuit, wherein the tap circuit is configured to:
   either apply a first tap weight to a first signal based on an output of the summing circuit in the first mode of the DFE or apply a second tap weight to a second signal based on the output of the summing circuit in the second mode of the DFE, wherein the second tap weight is greater than the first tap weight.

6. The apparatus of claim 5, wherein the second tap weight is three times greater than the first tap weight.

7. The apparatus of claim 1, further comprising:
   a first transistor coupled on a first circuit path between an output of the summing circuit and a ground node;
   a second transistor coupled on a second circuit path between the output of the summing circuit and the ground node;
   a first switch to either couple a gate of the first transistor to a gate of a third transistor in the first mode or couple the gate of the first transistor to the ground node in the second mode; and
   a second switch to either couple a gate of the second transistor to the gate of the third transistor in the first mode or couple the gate of the first transistor to the ground node in the second mode.

8. The apparatus of claim 1, further comprising:
   a first encoder coupled to the summing circuit;
   a second encoder coupled to the summing circuit;
   a transistor coupled on a circuit path between an output of the summing circuit and a ground node; and
   a switch to either couple a gate of the transistor to an output of the first encoder in the first mode or couple the gate of the transistor to an output of the second encoder in the second mode.

9. The apparatus of claim 1, further comprising an encoder coupled to a circuit path between an output of one of the multiple samplers and the encoder, wherein the encoder is configured to be either activated in the first mode of the DFE or deactivated in the second mode of the DFE.

10. The apparatus of claim 1, further comprising a delay circuit coupled to an output of the at least one sampler, wherein the delay circuit is configured to be either activated in the first mode of the DFE or deactivated in the second mode of the DFE.

11. The apparatus of claim 1, wherein each sampler of the multiple samplers includes a node to receive a supply voltage from a supply node, and wherein:

the node of at least one sampler of the multiple samplers configured to be deactivated in the second mode of the DFE is to decoupled from the supply node in the second mode of the DFE.

12. The apparatus of claim 1, wherein each sampler of the multiple samplers includes a node to receive a clock signal from a clock generator in the first mode of the DFE, wherein the clock generator is configured to deactivate the clock signal provided to the at least one sampler of the multiple samplers configured to be deactivated in the second mode of the DFE.

13. An apparatus comprising:
a first sampler in a decision feedback equalizer (DFE) configured to be either activated in a 4-level pulse-amplitude modulation (PAM4) mode or deactivated in a non-return-to-zero (NRZ) mode of the DFE;
a second sampler in the DFE configured to be activated in the PAM4 mode of the DFE to receive first input information from a summing circuit, and configured to be activated in the NRZ mode of the DFE to receive second input information from the summing circuit; and
a third sampler in the DFE configured to be either activated in the PAM4 mode of the DFE to receive the first input information from the summing circuit or deactivated in the NRZ mode of the DFE.

14. The apparatus of claim 13, further comprising the summing circuit coupled to the first, second, and third samplers, and a tap circuit coupled to an output of the summing circuit, wherein the tap circuit is configured to:

either apply a first tap weight to a first signal based on the output of the summing circuit in the PAM4 mode of the DFE or apply a second tap weight to a second signal based on the output of the summing circuit in the NRZ mode of the DFE, wherein the second tap weight is greater than the first tap weight.

15. The apparatus of claim 14, wherein the second tap weight is three times greater than the first tap weight.

16. The apparatus of claim 14, wherein the second tap weight is 1.5 times greater than the first tap weight.

17. The apparatus of claim 13, further comprising:
an encoder circuit coupled to the first, second, and third samplers; and
a group of delay circuits coupled to an output of the encoder circuit and coupled in series with each other, each delay circuit in the group of delay circuits configured to be decoupled from a supply voltage in the NRZ mode of the DFE.

18. An apparatus comprising:
conductive lines on a circuit board;
a first device including a transmitter coupled to the conductive lines; and
a second device including a receiver coupled to the conductive lines to receive an input signal from the conductive lines, the receiver including:
multiple samplers in a decision feedback equalizer (DFE), the multiple samplers including at least two samplers, at least one of the multiple samplers configured to be either activated in a 4-level pulse-amplitude modulation (PAM4) mode of the DFE to receive first input information from a summing circuit in a first mode of the DFE or activated in a non-return-to-zero (NRZ) mode of the DFE to receive second input information from the summing circuit; and
at least one sampler of the multiple samplers configured to be deactivated in the non-return-to-zero (NRZ) mode of the DFE.

19. The apparatus of claim 18, further comprising a tap circuit, wherein the tap circuit is configured to:
either apply a first tap weight to a first signal based on an output of the summing circuit in the PAM4 mode of the DFE or apply a second tap weight to a second signal based on the output of the summing circuit in the NRZ mode of the DFE, wherein the second tap weight is greater than the first tap weight.

20. The apparatus of claim 18, wherein the conductive lines are conforming with Peripheral Component Interconnect Express (PCIe) specifications.

* * * * *